US005457680A

United States Patent [19]

Kamm et al.

[11] Patent Number: 5,457,680
[45] Date of Patent: Oct. 10, 1995

[54] DATA GATEWAY FOR MOBILE DATA RADIO TERMINALS IN A DATA COMMUNICATION NETWORK

[75] Inventors: David A. Kamm, Tampa, Fla.; Stephen T. Parker, Raleigh, N.C.; Merl A. Trimmer, Jr.; Sherry L. Trimmer, both of Cary, N.C.

[73] Assignee: International Business Machines Corporation, Armonk, N.Y.

[21] Appl. No.: 62,624

[22] Filed: May 18, 1993

[51] Int. Cl.⁶ .............................. H04B 7/26; H04J 3/16; H04L 12/66
[52] U.S. Cl. ..................... 370/17; 370/94.1; 370/95.1; 379/59; 455/33.1; 455/56.1; 455/67.1
[58] Field of Search ................................. 370/13, 17, 24, 370/28, 29, 50, 60, 61, 85.7, 85.13, 94.1, 94.3, 95.1, 95.3; 379/58, 59, 60, 63; 455/33.1, 33.2, 34.1, 34.2, 53.1, 54.1, 56.1, 57.1, 67.1, 67.3

[56] References Cited

U.S. PATENT DOCUMENTS

| | | | |
|---|---|---|---|
| 4,280,020 | 7/1981 | Schnurr | 455/102 |
| 4,512,013 | 4/1985 | Nash et al. | 370/69.1 |
| 4,799,253 | 1/1989 | Stern et al. | 379/59 |
| 4,831,373 | 5/1989 | Hess | 455/34.1 |
| 4,837,800 | 6/1989 | Freeburg et al. | 379/59 |
| 4,876,740 | 10/1989 | Levine et al. | 379/59 |
| 4,881,271 | 11/1989 | Yamauchi et al. | 455/56.1 |
| 4,887,265 | 12/1989 | Felix | 370/94.1 |
| 4,912,756 | 3/1990 | Hop | 379/59 |
| 4,914,651 | 4/1990 | Lusignan | 379/59 |
| 5,159,593 | 10/1992 | D'Amico et al. | 370/95.3 |
| 5,159,596 | 10/1992 | Itoh | 370/95.1 |
| 5,175,867 | 12/1992 | Wejke et al. | 455/33.1 |
| 5,267,261 | 11/1993 | Blakeney, II et al. | 455/33.1 |
| 5,291,544 | 3/1994 | Hecker | 379/59 |

Primary Examiner—Alpus Hsu
Attorney, Agent, or Firm—Lauren C. Bruzzone; George E. Grosser

[57] ABSTRACT

A method is disclosed for managing the communication of data packets between a mobile data radio terminal and a plurality of fixed base stations in a data communications network. In a system of a plurality of base stations (each including a set of cellular telephone voice transceivers), wherein a first and second base stations are coupled through a home mobile data gateway (MDG) to the data communications network and a third base station is coupled through a server mobile data gateway to the data communications network, a method and apparatus which establishes in the home mobile data gateway, a forwarding address to a server mobile data gateway, sends forwarding information from the home mobile data gateway to the server mobile data gateway, and allocates with the server mobile data gateway, a new channel at the third base station, for the mobile data radio terminal. The method further includes determining which base station is providing better signal measurement data and allocating with the home mobile data gateway, a new channel at the better base station, for the mobile data radio terminal. The method further includes allocating an additional channel to the mobile data radio when the forward data packet size is greater than a threshold value. Further in accordance with the invention, when the system receives a forward data packet at the home mobile data gateway from the data communications network, directed to the mobile data radio terminal, it sends the forward data packet to the server mobile data gateway.

31 Claims, 12 Drawing Sheets

PACKET FROM AP_2 TO HOME MDG1 400

| HEADER (PKT#) | GATEWAY ID = MDG1 | TERMINAL ID = SU_1 | DATA "9W" | TRAILER |
|---|---|---|---|---|
| 402 | 404 | 406 | 408 | 410 |

PACKET FROM HOME MDG1 TO SERVER MDG2 420

| HEADER (PKT#) | GATEWAY ID = MDG2 | TERMINAL ID = SU_1 | DATA "9W" | TRAILER |
|---|---|---|---|---|
| 402 | 404 | 406 | 408 | 410 |

PACKET FROM SERVER MDG2 TO SERVER MDG3 430

| HEADER (PKT#) | GATEWAY ID = MDG3 | TERMINAL ID = SU_1 | DATA "9W" | TRAILER |
|---|---|---|---|---|
| 402 | 404 | 406 | 408 | 410 |

BEFORE SU_1 MOVES
(FOR FIG. 1A AT MDG1)     550

TABLE OF SIGNAL STRENGTHS RECEIVED AT DATA TERMINAL AND REPORTED BACK TO MDGs

| TERM-INAL | BASE STA. | MDG | RF SIG. STRENGTH |
|---|---|---|---|
| SU_1 | MDBS_1 | MDG1 | 0075 |
| SU_1 | MDBS_2 | MDG1 | 0005 |
| SU_2 | MDBS_1 | MDG1 | 0005 |
| SU_2 | MDBS_2 | MDG1 | 0080 |

FIG. 1M

AFTER SU_1 MOVES
(FOR FIG. 1D AT MDG1)     550

TABLE OF SIGNAL STRENGTHS RECEIVED AT DATA TERMINAL AND REPORTED BACK TO MDGs

| TERM-INAL | BASE STA. | MDG | RF SIG. STRENGTH |  |
|---|---|---|---|---|
| SU_1 | MDBS_2 | MDG1 | 0005 | ←552 |
| SU_1 | MDBS_3 | MDG2 | 0050 | ←554 |
| SU_2 | MDBS_1 | MDG1 | 0005 |  |
| SU_2 | MDBS_2 | MDG1 | 0080 |  |

FIG. 1N

BEFORE SU_1 MOVES     550
(FOR FIG. 1A AT MDG2)

TABLE OF SIGNAL STRENGTHS RECEIVED AT DATA TERMINAL AND REPORTED BACK TO MDGs

| TERM-INAL | BASE STA. | MDG | RF SIG. STRENGTH |
|---|---|---|---|
| SU_3 | MDBS_3 | MDG2 | 0075 |
| SU_3 | MDBS_4 | MDG2 | 0005 |
| SU_4 | MDBS_3 | MDG2 | 0005 |
| SU_4 | MDBS_4 | MDG2 | 0080 |

FIG. 1P

AFTER SU_1 MOVES     550
(FOR FIG. 1D AT MDG2)

TABLE OF SIGNAL STRENGTHS RECEIVED AT DATA TERMINAL AND REPORTED BACK TO MDGs

| TERM-INAL | BASE STA. | MDG | RF SIG STRENGTH |  |
|---|---|---|---|---|
| SU_1 | MDBS_2 | MDG1 | 0005 | ←556 |
| SU_1 | MDBS_3 | MDG2 | 0050 | ←558 |
| SU_3 | MDBS_3 | MDG2 | 0075 |  |
| SU_3 | MDBS_4 | MDG2 | 0005 |  |
| SU_4 | MDBS_3 | MDG2 | 0005 |  |
| SU_4 | MDBS_4 | MDG2 | 0080 |  |

FIG. 1Q

DATA GATEWAY FOR MOBILE DATA RADIO TERMINALS IN A DATA COMMUNICATION NETWORK

BACKGROUND OF THE INVENTION

The invention disclosed broadly relates to data processing systems and data communications networks and more particularly relates to establishing a network interconnection between mobile data terminals and a data communications network.

RELEVANT PATENT APPLICATIONS

The invention disclosed herein is related to the U.S. patent application, Ser. No. 07/740,753 filed Aug. 5, 1991, now U.S. Pat. No. 5,379,448, entitled "Digital Communications Network Using Radio Links", by R. N. Ames, et al., assigned to the IBM Corporation qa^Tabnnd incorporated herein by reference.

The invention disclosed herein is also related to the U.S. patent application, Ser. No. 07/747,216 filed Aug. 19, 1991, entitled "Methods In Apparatus For Decentralizing Uplink Network Control Functions And Minimizing Terminal Power Level Assessment Overhead In Radio Frequency Data Communications Networks", by R. N Ames, et al., assigned to the IBM Corporation and incorporated herein by reference.

The invention disclosed herein is further related to the U.S. patent application, Ser. No. 07/713,899 filed Jun. 12, 1991, now U.S. Pat. No. 5,404,392 entitled "Digital Cellular Overlying Network (DCON)", by R. V. Miller, et al., assigned to the IBM Corporation and incorporated herein by reference.

BACKGROUND OF: THE INVENTION

Mobile cellular radiotelephone service is presently readily available in many metropolitan areas around the world. The service is typically provided via cellular systems i.e., systems that have a coverage area divided into contiguous smaller coverage "cells" using low power transmitters and receivers. The limited cell area enables the channel frequencies in one cell to be reused in another geographically separated cell according to an established scheme. Thus, a large number of channels can be made available in a metropolitan area and service can appear to be identical to that of a standard telephone.

Cellular systems typically utilize one channel in each cell, called a "control channel" to receive requests for service from subscriber units to call other subscriber units and to instruct subscriber units (also referred to herein as "mobile telephone units") to tune to a frequency pair of a selected "voice channel" wherein a two-way (duplex) conversation may take place. The control channel continuously receives and transmits data and is the channel to which a mobile telephone unit automatically tunes when not in a voice conversational state.

In the prior art cellular telephone systems, telephone calls between two parties continue until their discussions are completed. Since both parties are continuously listening, either can ascertain that the discussions have been terminated and hang up. However, when making data calls on cellular telephone systems, the user is not continuously listening and, as a result, there may be long periods of time when there is no data activity although air time is being utilized. Since the user is billed for the actual air time utilized, the user is being charged at a relatively high rate for such long periods of inactivity.

Many applications, such as electronic mail, would find it advantageous to utilize an Advanced Mobile Phone System (AMPS) for data transmissions; however, such applications would not want to pay for day long voice calls. Also, a system capacity problem would be likely to result if data terminals (perhaps thousands of terminals coupled to a given network) competed with normal voice users for available system bandwidth.

A lower "bit rate" versus standard air time rates, would be both desirable and practical (for both the user and cellular company), if "scrap" air time could be identified, salvaged and be sold profitably by the cellular company. The existence of "scrap" air time (defined herein as unused and otherwise unusable air time) can easily be demonstrated based on the well known blocking and switching requirements of present day cellular telephone networks.

The U.S. Federal Communications Commission (FCC) required cellular telephone companies to provide telephone services to subscribers on a 2% blocking basis. This means a subscriber is guaranteed to complete a call on the first try 98% of the time. To achieve this blocking ratio, cellular telephone cell sites have excess capacity in terms of available channels and time. For example, present day cell sites are known that have the capacity to handle 57 channels of voice traffic. Further, it is known that a typical cellular telephone call lasts approximately 2 minutes and that it takes approximately 15 seconds for cell site equipment to transition from one call to another.

The addition of excess capacity due to the blocking factor and transition time represents a considerable percentage of total telephone cell site time availability which cannot be utilized for conversational voice communication. Accordingly, it would, be desirable if methods and apparatus were provided to utilize this time for data transmissions, without interfering with normal voice traffic. Techniques for using this excess and otherwise unusable time, will be referred to hereinafter as "Cellular Data Networking" (CDN) techniques.

Furthermore, it would be desirable to provide a digital network suitable for overlaying an existing AMPS, where the digital network (1) coexists with and is transparent with respect to the AMPS; (2) does not degrade the AMPS's voice capability or capacity to handle voice traffic; (3) utilizes excess and otherwise unusable air time (the aforementioned "scrap" air time), i.e. performs CDN; and (4) utilizes existing AMPS equipment wherever possible to keep the overlay network cost to a minimum.

The above cited patent applications by Ames et al. and Miller et al. describe a mobile data radio architecture for communicating a data packets across a radio link between a mobile data terminal and data base stations, within the context of a cellular voice communications radio network. What is needed is a technique for managing, sending, and receiving the data packets from the radio link at the network side, keeping track of the mobile subscriber's mobile radio terminal, ensuring that only the data received from and transmitted to the mobile radio subscriber does in fact get properly routed to and from him, and keeping track of how much data a mobile radio terminal user has sent and received, to enable establishing a basis for billing the radio terminal user.

OBJECTS OF THE INVENTION

It is an object to the invention to provide an interfacing system for keeping track of a mobile data radio terminal communicating with a data communication system.

It is another object of the invention to provide an interfacing system between a mobile data radio terminal and a data communications network, which ensures that data packets sent to and received from a mobile data radio subscriber are reliably communicated to and from that subscriber.

It is still another object of the invention to provide an interfacing system between a mobile data radio terminal and a data communications network, which keeps track of the amount of data which has been sent to and has been received the mobile data radio subscriber.

It is yet a further object of the invention to provide an interfacing system between a mobile data radio terminal and a data communications systems which is capable of accurately billing the mobile data radio user based upon his usage of the link.

SUMMARY OF THE INVENTION

These and other objects, features and advantages are accomplished by the invention. The invention establishes and maintains sessions while the mobile data radio terminal is moving relative to the fixed position of the base stations connected to the data communications network.

Thus, a method and system are disclosed for managing the communication of data packets between a mobile data radio terminal and a plurality of fixed base stations in a data communications network. Its primary application is for systems in which each base station includes a set of cellular telephone voice transceivers, each tuned to one of a preselected set of communication channels. Included in the system are means for coupling each transceiver in the set of transceivers to an antenna to facilitate the performance of duplex radio communications over the set of channels with the mobile data radio terminal within range of at least one of the fixed base stations.

The system includes a first and second base stations coupled through a home mobile data gateway (MDG) to the data communications network and a third base station coupled through a server mobile data gateway to the data communications network.

The method includes allocating with the home mobile data gateway, a first channel at the first base station, for a mobile data radio terminal.

When a data packet is received from the mobile data radio terminal, it includes first signal measurement data for the first base station, second signal measurement data for the second base station and third signal measurement data for the third base station.

In accordance with the invention, the method determines if the third signal measurement data is better than the first signal measurement data and the second signal measurement data and if so, it establishes in the home mobile data gateway, a forwarding address to the server mobile data gateway, sends forwarding information from the home mobile data gateway to the server mobile data gateway, and allocates with the server mobile data gateway, a new channel at the third base station, for the mobile data radio terminal.

If the third signal measurement data is not better than second signal measurement data, then the method determines if the second signal measurement data is better than the first signal measurement data and if so, allocates with the home mobile data gateway, a new channel at the second base station, for the mobile data radio terminal.

The method further includes monitoring the size of forward data packets received at the mobile data gateway from the data communications network to be sent to the mobile data radio terminal and allocating an additional channel to the mobile data radio when the forward data packet size is greater than a threshold value.

Further in accordance with the invention, when the system receives a forward data packet at the home mobile data gateway from the data communications network, directed to the mobile data radio terminal, it determines if the forwarding address exists in the home mobile data gateway, to the server mobile data gateway and if so, sends the forward data packet to the server mobile data gateway. If the forwarding address does not exist, then the system determines whether the mobile data radio terminal has a channel allocated from either the first base station or the second base station and if so, sends the forward data packet to either the first or second base station determined to have a channel so allocated.

Within a larger geographic area, there may be a plurality of mobile data gateway systems, a first mobile data gateway system controlling communications within base station cells connected to the first station and the second mobile data gateway system controlling communications within a second set of cells connected to it. Further, in accordance with the invention, as a mobile data radio terminal moves within the geographic area with respect to the fixed location of the base station cells, when the mobile data radio terminal traverses from the domain of base station cells connected to the first mobile data gateway into a different domain of base station cells connected to the second mobile data gateway, the mobile data gateways coordinate the transfer of control of the communicating session with the data communications network.

DESCRIPTION OF THE FIGURES

These and other objects, features and advantages will be fully appreciated with reference to the accompanying figures.

FIG. 1A illustrates a flow diagram of a sequence of operational steps for the mobile data management program 112.

FIG. 1M illustrates a table of signal strengths for FIG. 1A at the home gateway, before SU-1 moves.

FIG. 1N illustrates the table of signal strengths for FIG. 1D at the home gateway, after SU-1 moves.

FIG. 1P illustrates the table of signal strengths for FIG. 1A at the server gateway, before SU-1 moves.

FIG. 1Q illustrates the table of signal strengths for FIG. 1D at the server gateway, after SU-1 moves.

DISCUSSION OF THE PREFERRED EMBODIMENT

Figure 1:
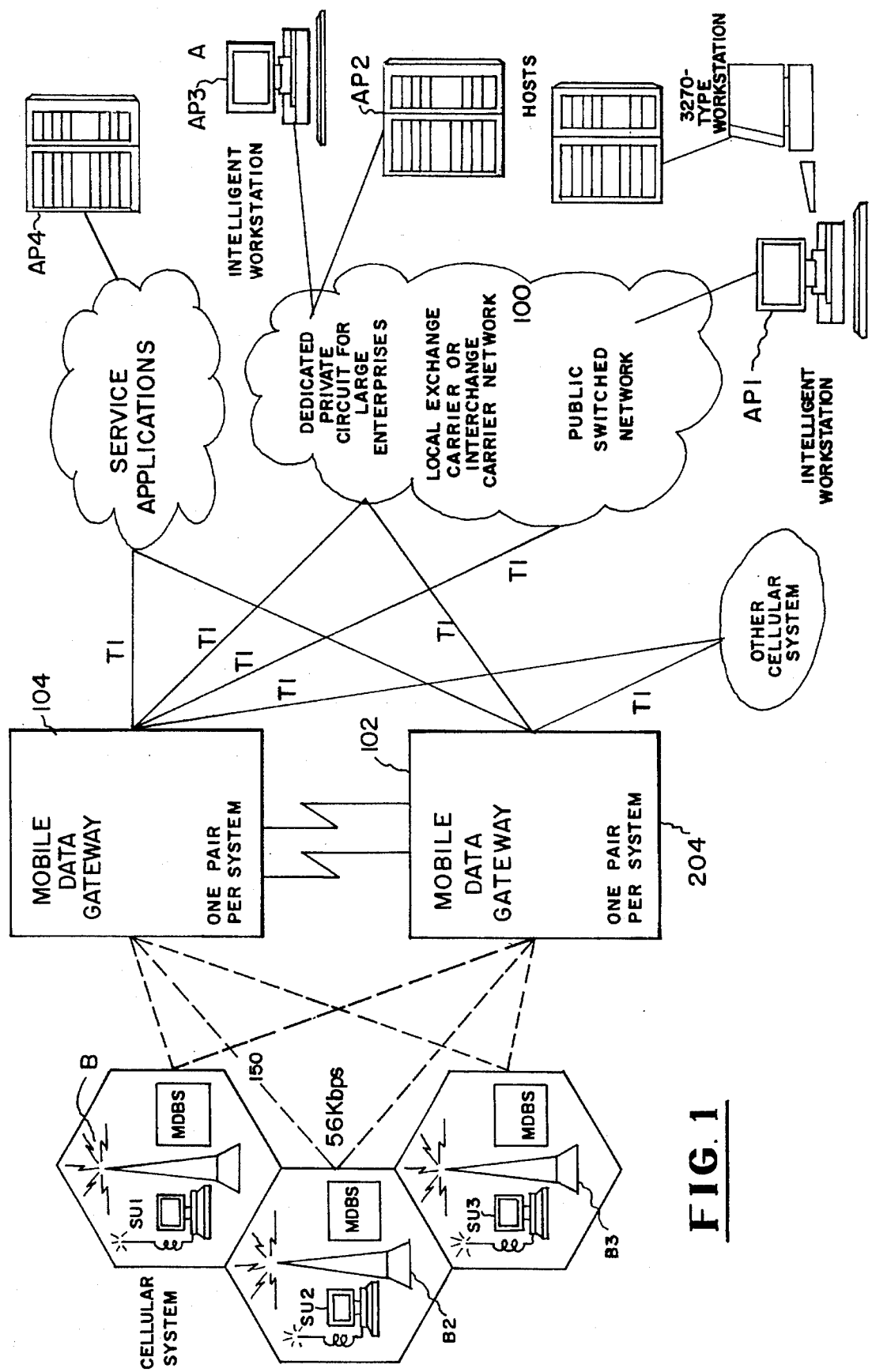
FIG. 1 is an overall network diagram illustrating the application of the invention.

FIG. 1 shows an overall communication system application making use of the invention. The data communications network 100 interconnects several processors running applications AP-1, AP-2, AP-3 and AP-4 to the mobile data gateways 104 and 204. The base stations B1, B2 and B3 are connected to the mobile data gateways 104 and 204. Each base station, B1, B2 and B3, establishes a cellular radio region within which mobile voice telephone units and mobile data radio terminals can communicate to the base station. FIG. 1 shows the mobile data radio terminals SU-1, SU-2 and SU-3 arranged respectively in the cellular regions of B1, B2 and B3, respectively. In accordance with the invention, the mobile data gateways 104 and 204 facilitate the tracking and communication between the stationary data communication system 100 and the mobile terminals SU-1, SU-2 an, SU-3 as they traverse different base stations (B1, B2, B3) and traverse different domains established respectively by the gateways 104 and 204.

Figure 1A:
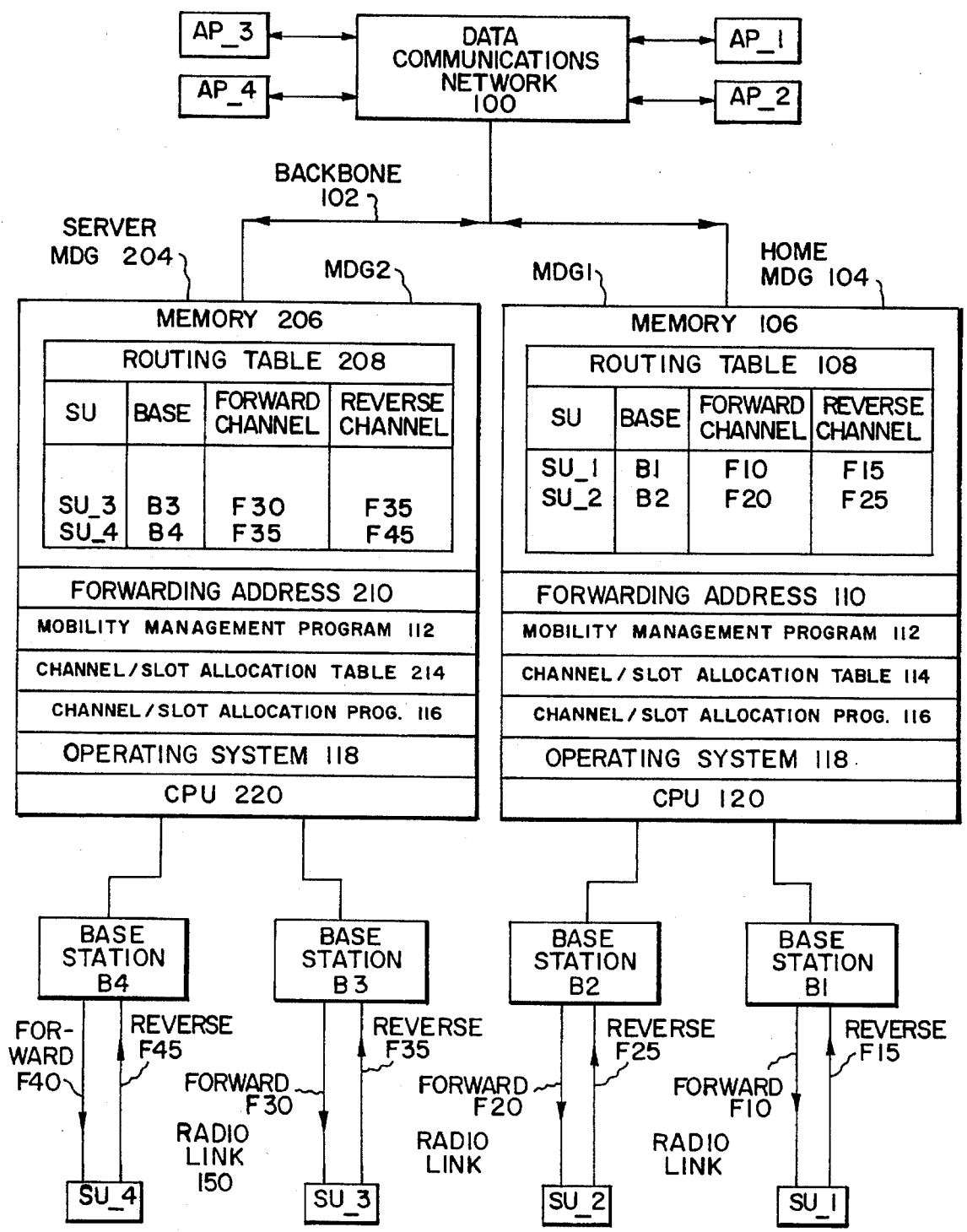
FIG. 1A is a functional block diagram illustrating the arrangement of two mobile data gateways in the network of FIG. 1.

Reference to FIG. 1A will provide a more detailed illustration of some of the features of the invention. FIG. 1A shows the data communications network 100 with the four data processing systems running applications AP-1, AP-2, AP-3 and AP-4. The data communications network 100 will communicate through a backbone network 102 to either the home mobile data gateway 104 or the server mobile data gateway 204, depending upon an address header. Reference can be had to FIG. IF for an illustration of a data packet from AP-2 directed to the home mobile data gateway 104 over the backbone network 102.

In FIG. 1A, the home mobile data gateway 104 includes the memory 106 and the CPU 120, which couple the base station B1 and the base station B2 to the data communications network 100. Memory 106 includes a routing table 108, a forwarding address partition 110, the mobile data management program 112, also referred to as the mobility management program 112, the channel/slot allocation management program 116, the channel/slot allocation table 114, the operating system 118. All of the programs contained in the memory 106 are sequences of executable instructions which are executed in the CPU 120 to carry out the functions to be performed by the programs.

A similar arrangement is shown in the server mobile data gateway 204, wherein the memory 206 includes a routing table 208, a forwarding address partition 210, the mobile data management program 112, slot allocation table 214, a channel/slot allocation management program 116, and the operating system 118, all associated with the CPU 220. The programs stored in the memory 206 are executed by the CPU 220. The server gateway 204 couples the base stations B3 and B4 to the data communications network 100.

As can be seen in the illustration of FIG. 1A, four mobile data radio terminals are shown with SU-1 having forward channel F10 and a reverse channel F15 allocated for base station B1, terminal SU-2 having forward channel F20 and reverse channel F25 allocated for base station B2, both of these terminals being within the domain established by the home gateway 104. The terminal SU-3 has a forward channel F30 and a reverse channel F35 for the base station B3 and the terminal SU-4 has a forward channel F40 and a reverse channel F45 for the base station B4, which are established within the domain defined by the server gateway 204.

The routing table 108 in the home gateway 104 contains routing information relating each mobile terminal SU-1 and SU-2 within its domain to its corresponding base station B1 and B2, respectively. The routing table 108 can also provide the identity of the forward channel and the reverse channel for each respective terminal SU-1 and SU-2. Similarly, a routing table 208 for the server gateway 204 can include the relationship between the terminal SU-3 and the base station B3 and SU-4 and the base station B4. It can also include the identity of the forward channel and reverse channel for each respective terminal SU-3 and SU-4.

Figure 1B:
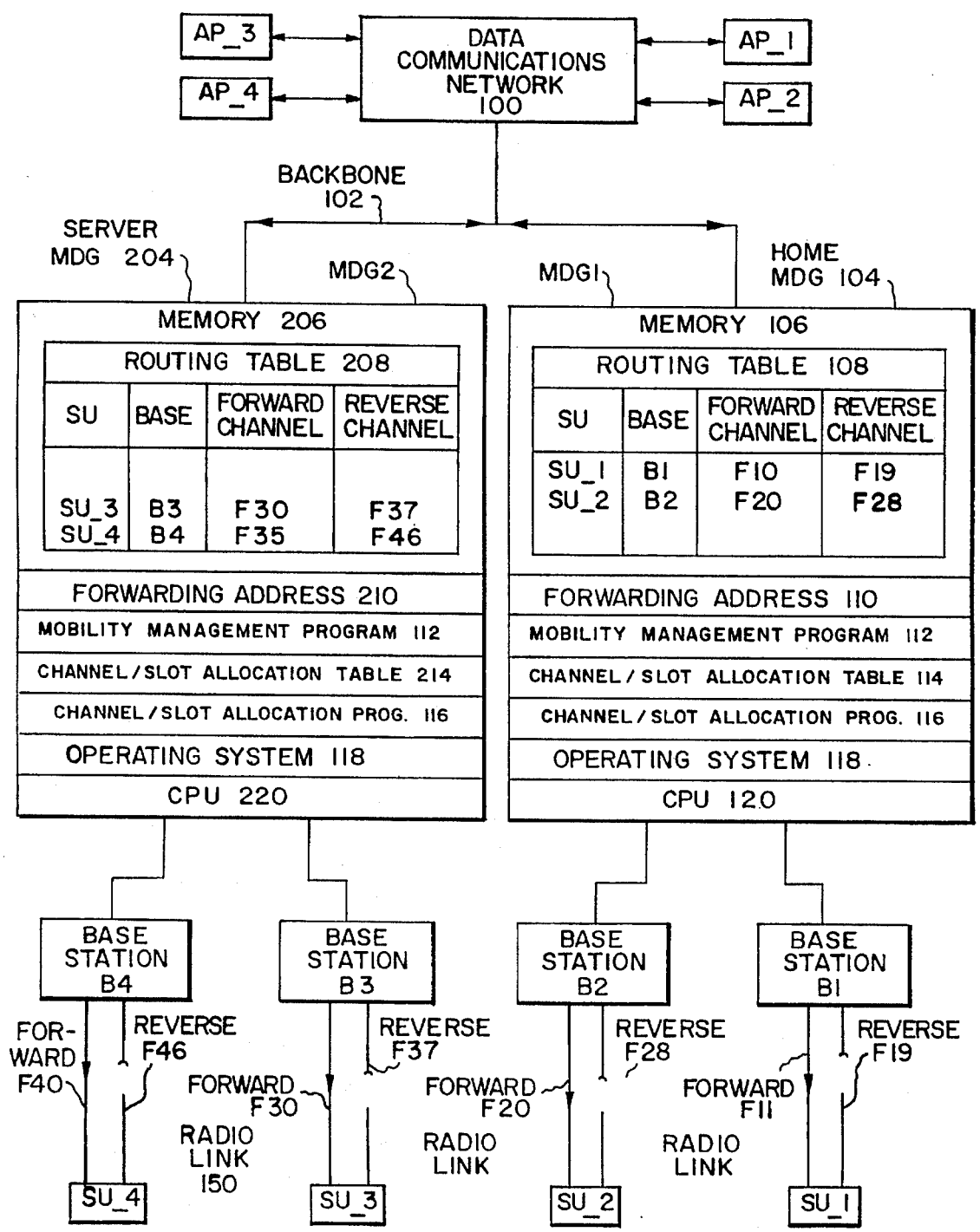
FIG. 1B illustrates the allocation of alternate channels to mobile data radio terminals in the system.

Reference to FIG. 1B illustrates the same geographic location for the mobile data radio terminals SU-1, SU-2, SU-3 and SU-4 as is found in FIG. 1A, with a difference that the routing table 108 in the home gateway 104 has stored a different channel allocation for the forward channel F11 for the terminal SU-1 and the reverse channel F19 for the terminal SU-1. Similarly, SU-2 is shown having a new reverse channel allocation F28. Similarly, FIG. 1B shows routing table 208 for the server gateway 204 having stored a new reverse channel assignment F37 for the terminal SU-3 and F46 for the terminal SU-4.

Figure 1C:
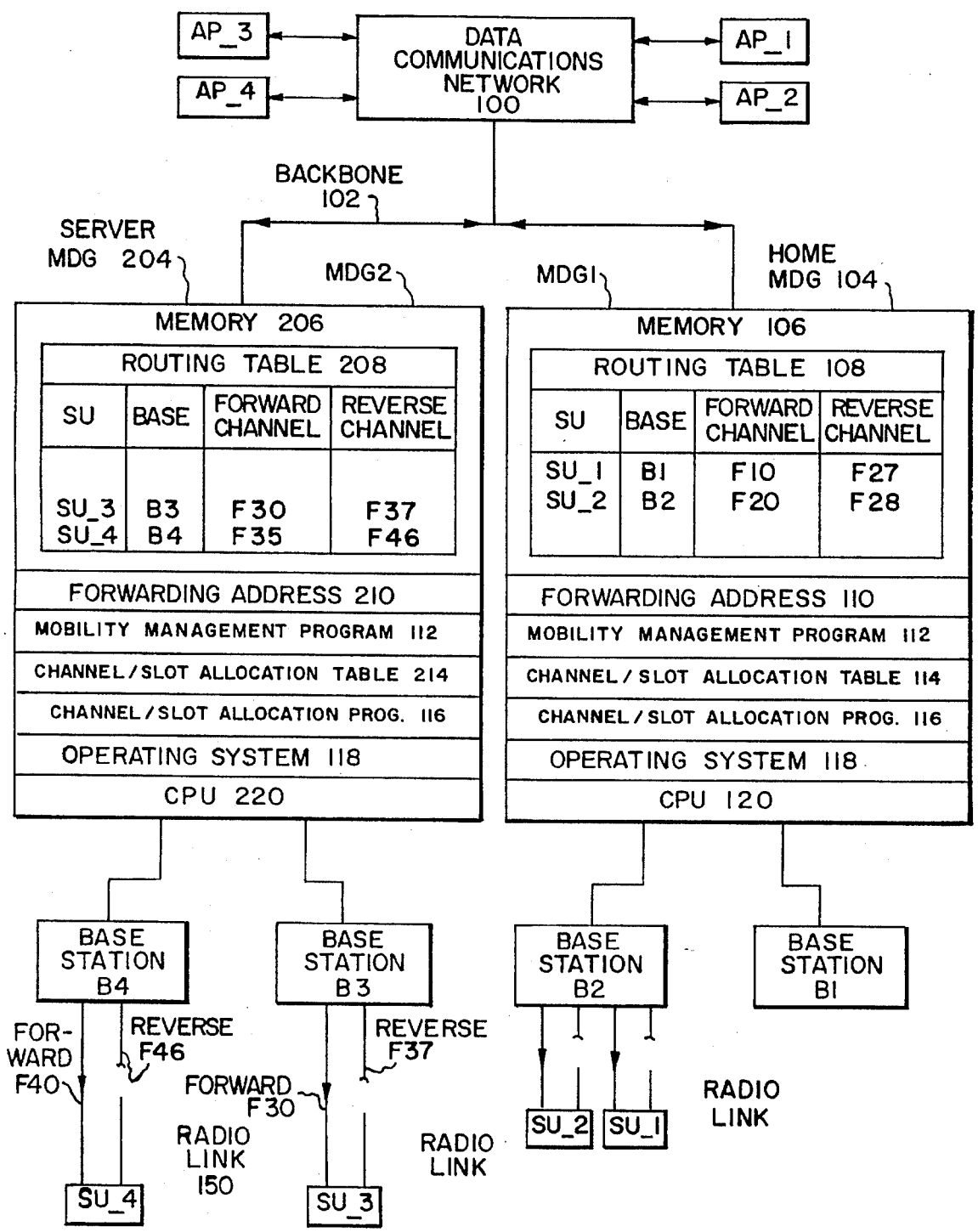
FIG. 1C illustrates the movement of the mobile data radio terminal SU-1 from its position shown in FIG. 1A.

Reference to FIG. 1C will show a new geographic configuration for the mobile data radio terminal SU-1 which has moved further away from its original base station B1 and closer to the base station B2. This can be seen as reflected in the routing table 108 for the home gateway 104, wherein both SU-1 and SU-2 are shown in the routing table as having channels allocated from the base B2. This reallocation of channels will be described in greater detail in connection with the mobile data management program 112 and the channel/slot allocation management program 116.

Figure 1D:
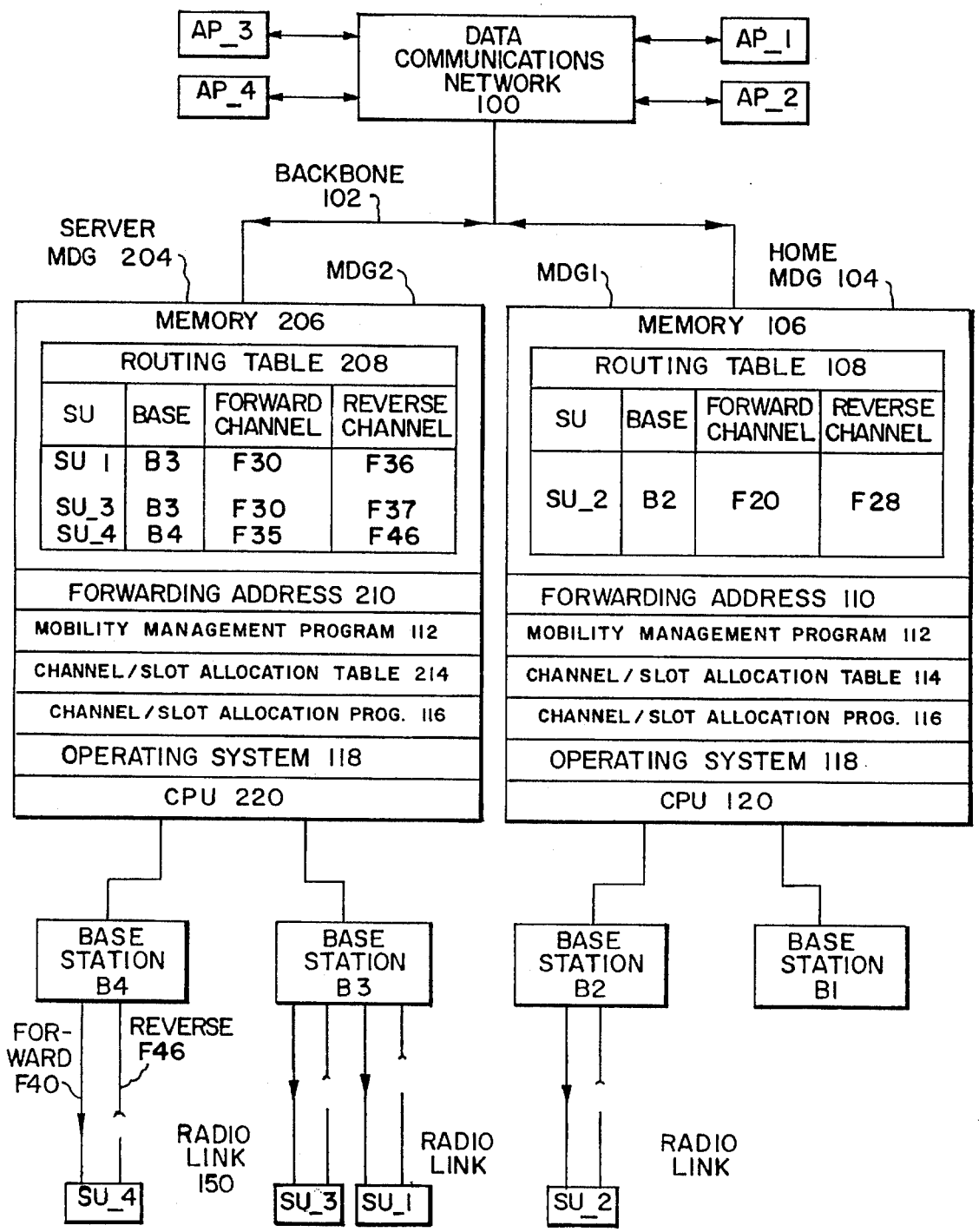
FIG. 1D illustrates the movement of the mobile data radio terminal SU-1 from its position shown in FIG. 1C.

Reference to FIG. 1D shows still a further change in the geographic location of the mobile data radio terminal SU-1 as having moved out of the domain of the home gateway 104, away from the base stations B1 and B2, to become closer to the base station B3 which is within the domain of the server gateway 204. As can be seen in FIG. 1D, this change in geographic location of the terminal SU-1 is reflected in the routing table 108 for the home gateway 104 and the routing table 208 for the server gateway 204. In the routing table 108, the SU-1 entry has been removed and in the routing table 208 the SU entry has been stored, and the corresponding base B3 is shown has having forward channel F30 and reverse channel F36 assigned or allocated to SU-1. This operation will be described in greater detail in connection with the discussion of the mobile data management program 112 and the channel/slot allocation management program 116.

Figures 1E, 1F, 1G, 1H:
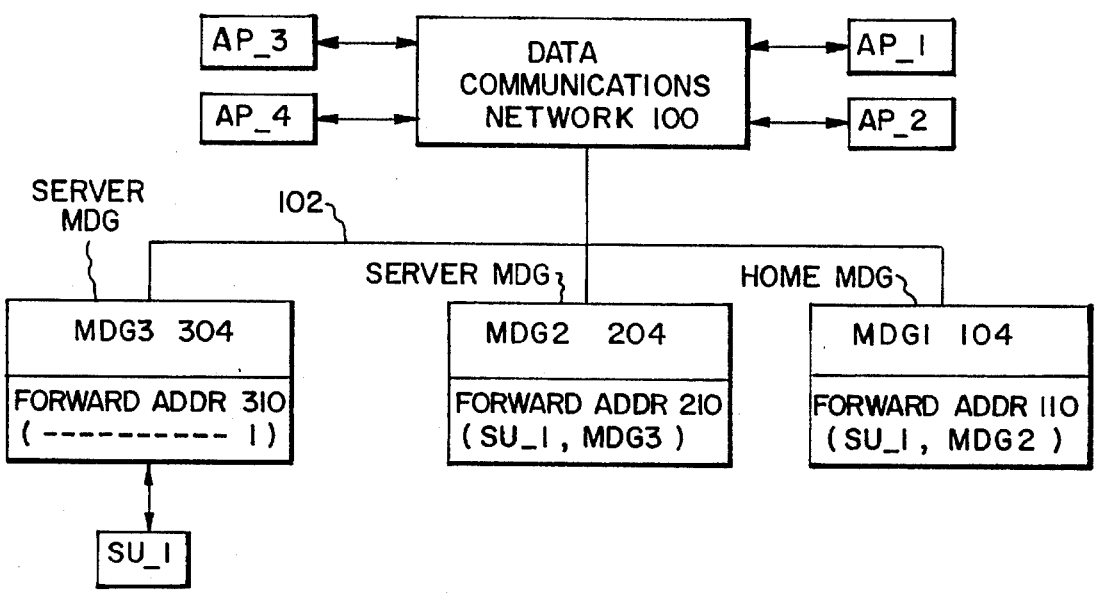
FIG. 1E shows an overall organizational diagram for three mobile data gateways, in accordance with the invention.
FIG. 1F shows the packet from the application AP-2 to the home gateway 104.
FIG. 1G illustrates a packet which is forwarded from the home gateway 104 to the server gateway 204.
FIG. 1H illustrates a packet from the server 204 to the server gateway 304.
Figure 11:
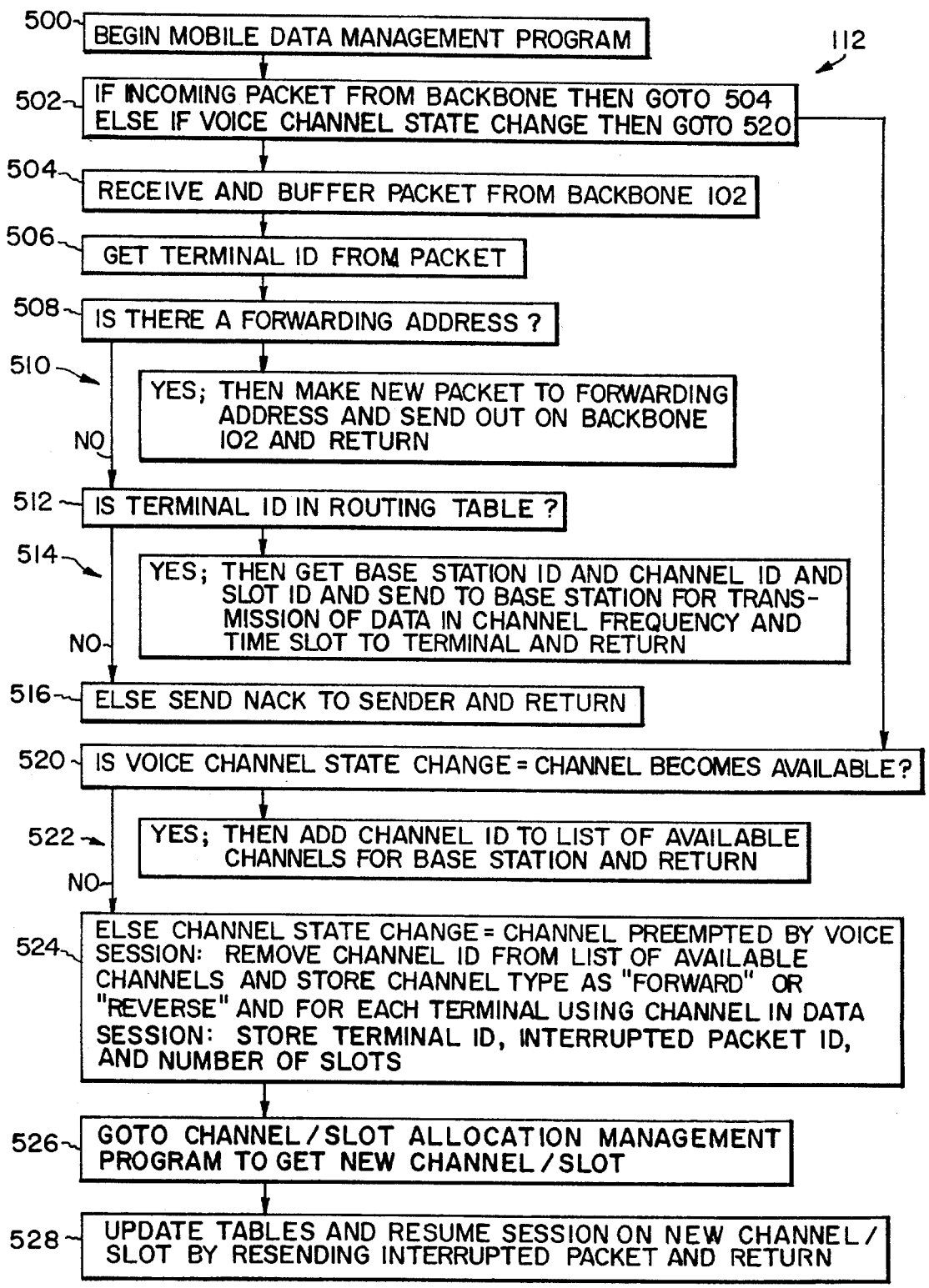

FIG. 1E illustrates one of the features of the invention, the forwarding of a packet from the home gateway 104 to the server gateway 204 and the server gateway 304, when the mobile data radio terminal SU-1, which is the destination for the packet, has changed its geographical location from the gateway 104 to gateway 204 and then to gateway 304. In accordance with the invention, a forwarding address partition. 110 provided in the home gateway 104, will originally manage the communications between the data communications network 100, through the base station B1 or the base station B2, and the data radio terminal SU-1, as shown in FIGS. 1A and 1C. When the mobile data radio terminal SU-1 moves into the domain of the server gateway 204, as shown in FIG. 1D, a forwarding address is created in the home gateway 104, in the forward address partition 110. FIG. 1E shows the forward address as identifying the destination terminal SU-1 and the gateway to which the packet is to be forwarded which is MDG2, the address of the server gateway 204. Packets which have the mobile terminal SU-1 as their destination, will be forwarded from the home gateway 104 to the server 204 when SU-1 is within the domain of the server gateway 204. In FIG. 1E, the terminal SU-1 has moved further out of the domain of the gateway 204 into the domain of server gateway 304. Accordingly, a second forwarding address is stored in the forward address partition 210 of the server gateway 204, directing all packets having a destination of the terminal SU-1, to be further forwarded to the server gateway 304 which has the address MDG3. The process for reassigning forwarding addresses is further described in the discussion of the channel/slot allocation management program 116.

FIG. 1F shows the format of a data packet from a data processor application AP-1 in the data communications network 100, with a header 402 and gateway id 404 which directs the packet over the backbone 102 to the home gateway 104. The packet of FIG. 1F includes the identity SU-1 of the terminal in field 406. Data is contained in field 408 and a trailer for the packet is contained at 410. The packet 400 of FIG. 1F is directed to the home gateway 104 which is the gateway whose domain had the original assignment of channels for communication over the radio link 150 to the mobile data terminal SU-1.

FIG. 1G shows a packet 420 with a similar format of that shown in FIG. 1F, the packet 420 being a forwarding packet from the home gateway 104 to the server 204, when the mobile data radio terminal SU-1 has moved into the domain of the server gateway 204.

FIG. 1H shows the packet 430 whose format is similar to that shown in FIG. 1G, for a packet forwarded from the server gateway 204 to the server gateway 304, when the mobile data radio terminal SU-1 has moved from the domain of the server 204 to the domain of the server gateway 304.

FIG. 1I illustrates a flow diagram of the sequence of operational steps for the mobile data management program 112. Step 500 begins the mobile data management program which flows to step 502 which determines if an incoming packet from the backbone 102 has arrived and if it has then the program flows to step 504. Otherwise, if a voice channel state change has been reported to the gateway, then the program flows to step 520.

In step 504 of FIG. 1I, a data packet is received and buffered from the backbone network 102, the packet may have come from the data communications network 100 or alternately it may be a forwarded data packet from another gateway 104, for example. Then step 506 gets the terminal id from the packet, as can be seen in the packet formats of FIGS. 1F, 1G and 1H. Then step 508 determines if there is a forwarding address stored in the forwarding address partition 110 of the gateway 104. Step 510 has determined that yes there is a forwarding address present and therefore a new packet is assembled as shown in FIG. 1G, for example, and has a forwarding address included in it and the packet is sent out on backbone to the forwarded gateway. Step 510 then returns to the main program.

In step 512, if there is no forwarding address in the forwarding address partition 110, then step 512 determines if there is a terminal id for the referred terminal in the routing table, that is the terminal id stated in the packet 400 of FIG. 1F is also represented in the routing table 108. Step 514 has determined yes there is this terminal id in the routing table, and therefore step 514 gets the base station id and the channel id and slot id corresponding to this terminal. The base station id and channel id can be obtained from the routing table 108. The slot id is obtained from the channel/slot allocation table 214 which shown in FIG. 1J. These values are then sent to the base station, for example base station B1 for the configuration shown in FIG. 1A, for transmission of the data in the channel frequency and in the time slot given by the routing table 108 and channel/slot allocation table 214, the packet being transmitted over the radio link 150 to the terminal SU-1, for example. Then step 514 returns to the main program. If a packet 400 is received from the backbone 102 which doesn't have a forwarding address for it and for which there is no terminal id in the routing table, then step 516 will respond with a negative acknowledgement or NACK signal to the sender, and then return to the main program.

Figure 1J:
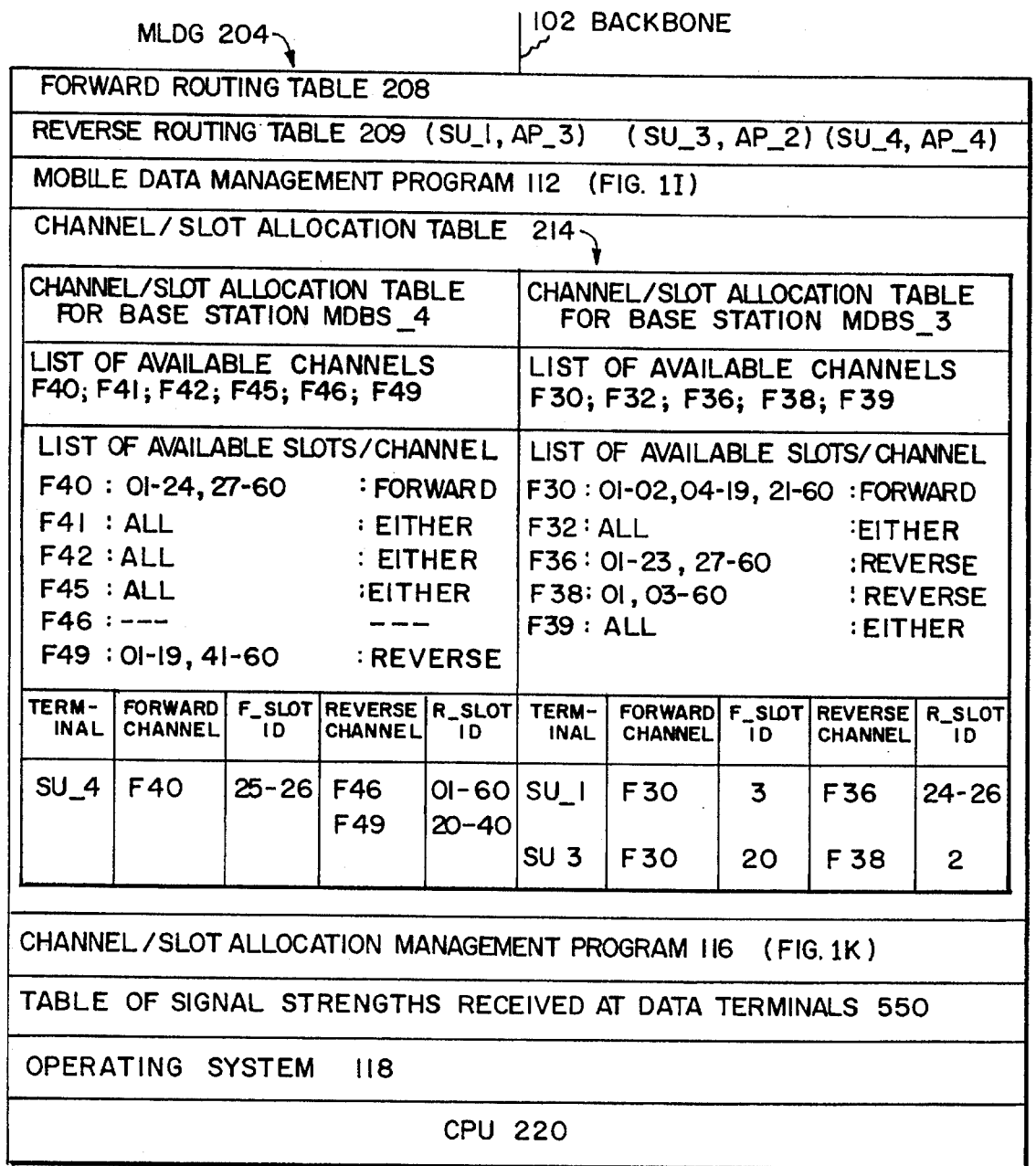
FIG. 1J is a more detailed block diagram of the mobile data gateway 204, illustrating the channel/slot allocation table 214.

If there has been a voice channel state change in flow diagram of FIG. 1I, then step 520 determines if the state change is that a channel has become available. Step 522 has determined that yes a channel has become available and the channel id is then added to the list of available channels for the base station, as is shown in FIG. 1J. FIG. 1J shows that a list of available channels is maintained in the channel/slot allocation table 214 for each base station. Then step 522 of FIG. 1I returns to the main program.

In step 524, if it is determined that a channel has been preempted by a voice session, then step 524 removes the channel id from the list of available channels in the channel/slot allocation table 214. It stores the channel type as forward or reverse, and for each terminal id using the preempted channel in a data session, it stores the terminal id, the interrupted packet id and the number of time slots which where allocated to that particular terminal id. Then in step 526, the program goes to the channel/slot allocation management program 116 of FIG. 1K to get a new channel and slot allocation. Then in step 528, the routing table 108 and the channel/slot allocation 214 are updated and the data session is resumed on the new allocated channel and time slot, by re-sending the interrupted packet. Then the program returns to the main program. Each packet, such as the packet 400 of FIG. 1F, includes in its header a packet number which is a serialized number showing the serial order of that packet with respect to other packets being transmitted over the radio link 150. If a particular packet has its transmission interrupted on the radio link 150 because of pre-emption of the allocated channel by voice activity at the base station, then that packet is resent once a new channel and time slot have been allocated for that terminal.

FIG. 1J shows a more detailed illustration of a mobile data gateway such as the server mobile data gateway 204. The home mobile data gateway 104 has the same arrangement as the gateway 204 shown in FIG. 1J. The memory in the gateway 204 is shown including the routing table 208 for forward packets directed from the data communications network 100, from the base station over the radio link 150 to the mobile data radio terminal, such as the terminal of SU-1. Also, a reverse routing table 209 is shown in the memory of gateway 204, which stores the paired identities of the mobile data radio terminal and the corresponding network processor with which it communicates. For example, table 209 is shown routing packets sent from the terminal SU-1 over the radio link 150 through a base station connected to the gateway 204 with its ultimate destination being the processor application AP-3. This corresponds to the geographic arrangement of SU-1 as is shown in FIG. 1D. Also shown in table 209 of FIG. 1J, SU-3 communicates with AP-2 and SU-4 communicates with AP-4. Also shown in FIG. 1J is the mobile data management program 112 and the channel/slot allocation table 214. Table 214 is shown in greater detail in FIG. 1J, and indicates how the list of available channels is attributed for each base station connected to the gateway 204, in this case the base station B3 and B4. Also shown in the channel/slot allocation table 214 is the list of available slots for each channel. Also shown in the table 214 is the assignment of the forward channel and the forward time slots for the terminal and the reverse channel and reverse time slots for the terminal.

Also shown in FIG. 1J is the channel/slot allocation management program 116 in the gateway 204, the table strengths 550 received from the data terminals, which are shown in greater detail in FIGS. 1M, 1N, 1P, and 1Q.

Figure 1K:
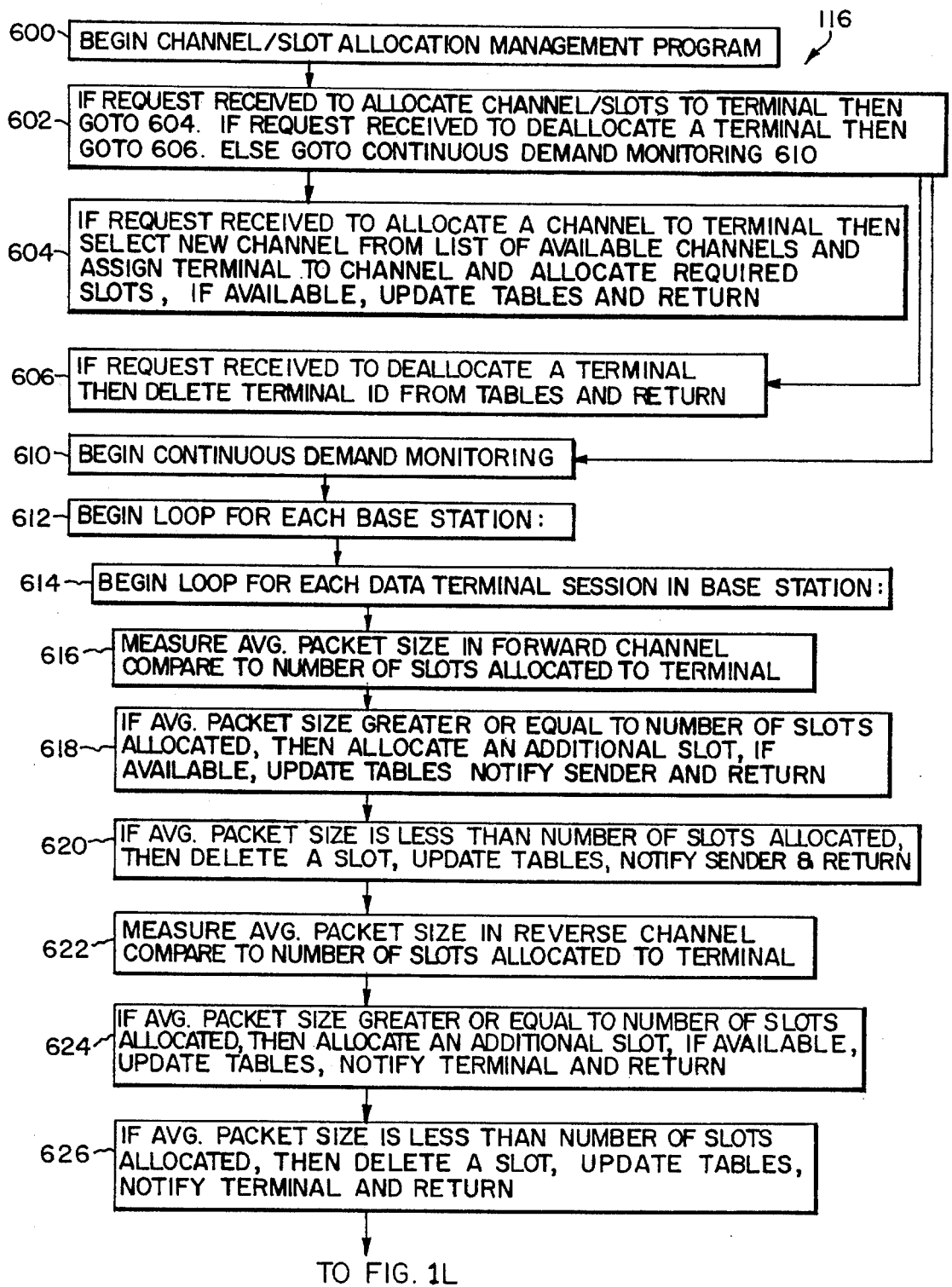
FIG. 1K illustrates a sequence of operational steps in the flow diagram of the channel/slot allocation management program 116.

FIG. 1K is a flow diagram the sequence of operational steps for the channel/slot allocation management program 116. The flow diagram continues on FIG. 1L. Step 628 in FIG. 1L goes to the strength monitoring routine which is shown in the flow diagram of FIG. 1S. The flow diagram of FIG. 1K begins with step 600 which begins the channel/slot allocation management program 116. Then step 602 determines if a request has been received to allocate a channel or slots to a terminal and if it has then the program flows to step 604. If a request has been received to de-allocate a terminal then the program flows to step 606. Alternately step 404 flows to step 610 which performs a continuous demand monitoring operation.

If a request has been received to allocate channel or slots to a terminal, then step 604 selects a new channel from a list of available channels in the table 214 and assigns the channel to the terminal and allocates any required times slots if they are available, and then updates the routing table 108 and the channel/slot table 114 or 208 and 214 for the gateway. Step 604 then returns to the main program.

In step 606, if a request is received to de-allocate a terminal, then the terminal id is deleted from the routing table 108 and from the channel/slot allocation table 214 and then step 606 returns to the main program.

Step 610 begins the continuous demand monitoring operation. Step 612 begins a loop for each base station and step 614 begins a loop for each data terminal session in a base station, these loops going respectively to step 652 and 650 in FIG. 1L. Step 616 within the loop for each data terminal session in a base station, measures the average packet size in the forward channel and compares it to the number of slots allocated to the terminal. Then step 618 determines if the average packet size is greater to or equal to the number of slots which have been allocated and if it is, then it allocates an additional slot, if it is available, as can be determined from the channel/slot allocation table 214 in FIG. 1J. The channel/slot allocation table 214 is then updated, the sender is optionally notified of the increase in the number of slots, and then the step returns to the main program. In step 620, if the packet size is less than the number of slots allocated then the slot can be deleted, the channel/slot allocation table 214 is updated, the sender can be optionally notified of the deletion of the slot, and the step returns to the main program.

Step 622, the reverse channel is examined for average packet size and is compared to the number of slots allocated to the terminal. Step 624, if the average packet size is greater or equal to the number of slots allocated, then it allocates an additional slot if available, updates the tables, optionally notifies the radio terminal, and then returns to the main program. In step 626, if the average packet size is less than the number of slots allocated, than a slot is deleted, the tables are updated, the terminal is optionally notified, and step returns to the main program.

Figures 1L, 1R:
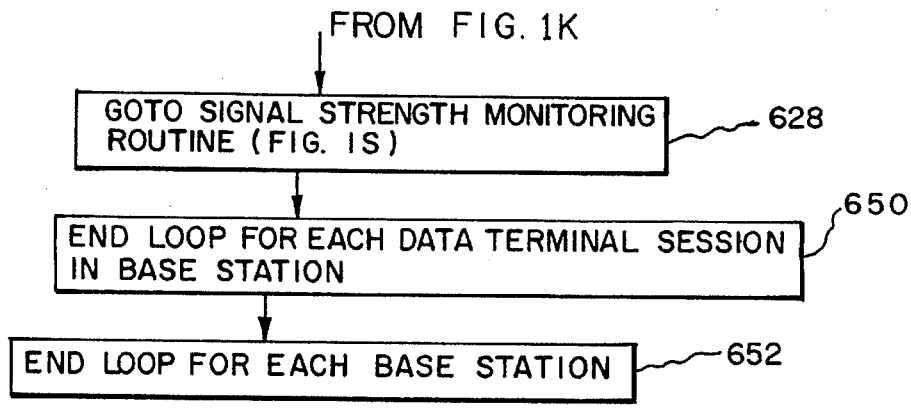
FIG. 1L is a continuation of the flow diagram of FIG. 1K.
FIG. 1R illustrates a radio link packet from SU-1 mobile data radio terminal.
Figure 1S:
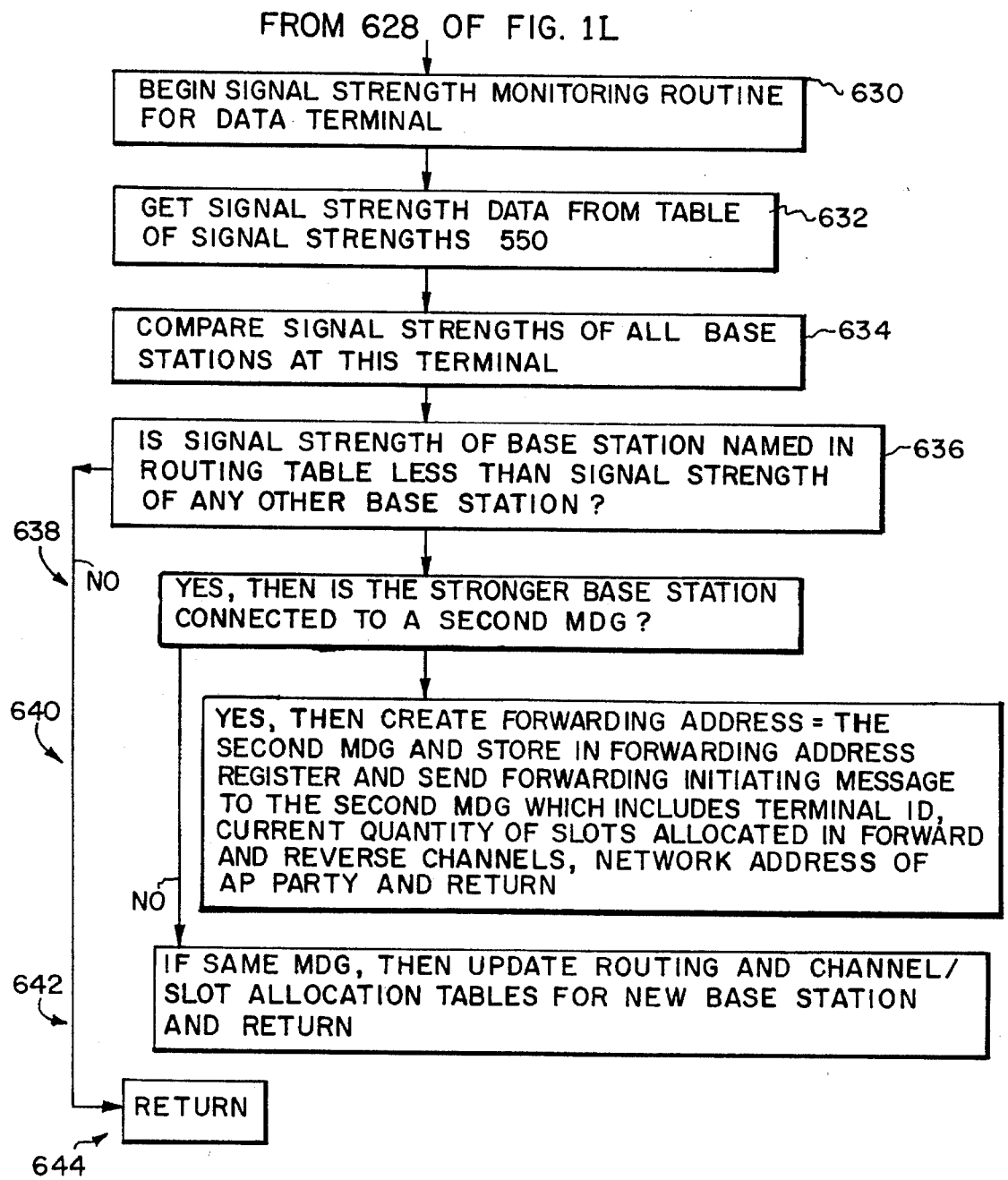
FIG. 1S illustrates a sequence of operational steps from step 628 of the flow diagram of FIG. 1L.

The flow diagram of FIG. 1K then flows to step 628 in FIG. 1L, which goes to the signal strength monitoring routine in FIG. 1S.

In FIG. 1S, step 130 is arrived at from step 628 in FIG. 1L. Step 630 begins the signal strength monitoring routine for a data terminal. Step 632 gets the signal strength data from the table of signal strengths 550, shown in FIG. 1M, for example. And then in step 634, the signal strengths are compared for all of the base stations whose signals are received at this mobile terminal. Then in step 636, if a signal strength of the base station named in the routing table is less than the signal strength of any other base station then program flows to step 638. If similar strength of the base station named in the routing table is greater than or at least equal to the signal strength of all of the base stations whose signals are received by this terminal, then the program flows to step 644 which returns to the main program.

In step 638, if the signal strength of the base station named in the routing program is less than the signal strength in any other base station, then it is determined if the stronger base station is connected to another gateway, for example the gateway 204 instead of the gateway within which the program 113 is running, that is the gateway 104. If the strongest base station signal is coming from another gateway, then step 640 creates a forwarding address which is the address of the stronger gateway, for example the server gateway 204. This forwarding address is then stored in the forwarding address register 110 of the home gateway 104. Then a forwarding initiating message is sent over the backbone 102 from the home gateway 104 to the server gateway 204, which includes the terminal id for the terminal, for example SU-1 in FIG. 1D, the current quantity of time slots which have been allocated in both the forward and reverse channels for the terminal SU-1, for example, and the network address of the communicating party in the network, for example SU-1 is communicating with the processor application AP-3 and so this information is then forwarded to the server gateway 204 over the backbone 102. Then step 640 returns to the main program.

If the strongest base station signal received by a terminal remains in the same gateway domain as the currently assigned base station channel, such as is the case for FIG. 1C and the terminal SU-1, then step 642 updates the routing table 108 and the channel/slot allocation table 114 for the new base station B2, in FIG. 1D. Then step 642 returns to the main program. The main program in this case is returning to 628 in the channel/slot allocation management program 116 shown in FIG. 1L. The program then flows to step 650 which ends the loop for each data session in the base station. After all data terminals in the current base station have been treated in the loop, then the program flows to step 652 which ends the loop for each base station. After all of the base stations connected to the gateway, such as the gateway 104, have been handled by the program 116, then the program returns to the main program.

FIG. 1M shows a table of signal strengths received at a data terminal and reported back to the gateways, table 550. FIG. 1M corresponds to FIG. 1A at the gateway 104 before the terminal SU-1 moves. FIG. 1N corresponds with FIG. 1D at the home gateway 104 after SU-1 moves. Note that at 552, the RF signal strength recorded in the table has diminished for SU-1 in the base station B2 and at 554 it has increased for the base station B3, which is in the different gateway domain for the server 204. FIG. 1P shows table 550 for configuration of 1A at the second or server gateway 204 before SU-1 moves and FIG. 1Q shows the table 550 after SU-1 moves. Note that in FIG. 1Q, at 556, the RF signal strength for the signal strength received at SU-1 for base station B2 has diminished and the signal strength SU-1 receives from base station B3 has increased at 558. Table 550 is used in the strength monitoring routine shown in FIG. 1S.

FIG. 1R shows the format of the radio link packet 570 from the mobile terminal SU-1 over the radio link 150 directed to the base station B2. The packet 570 includes the header 572, the optional destination address to the base station in field 574, and the origin terminal optionally in 576. Of particular interest is the table of signal strengths 578 which are the signal strengths received at the terminal SU-1 from the base station B2 and base station B3. It is these signal strength values which are stored in the table 550 of FIG. 1M, for example. The data field 580 is contained in the packet 570 followed by the trailer field 582.

The management functions provided by the system and method of the mobile data gateway keeps track of the mobile data radio terminals, ensures that data packets sent to and received from a mobile data radio terminal subscriber are reliably communicated to and from that subscriber, keeps track of the amount of data which is been sent to and received from the mobile data radio subscriber, so that the effect of the geographic movement of the mobile data radio terminal with respect to the fixed base stations and data communications network becomes transparent to the parties communicating over the network.

MORE DETAILED DESCRIPTION OF THE PREFERRED EMBODIMENT

The MDG provides a connection for terminals or processes enabled by cellular system connectivity to applications available through many types of network access. The solution provides an end-to-end communication path, with the necessary transaction integrity, for data packets.

In addition, the solution allows multiple cellular providers to provide seamless service to their customer set. That is, the end user has the ability to access data networks through all providers so that a single solution can be used as the user moves geographically, switching from one provider to another.

The MDG system works together with existing air time link protocols and network gateway controllers. An example of the air time link protocol is described in patent applications to Ames, et al and to Miller, et al, referenced above.

The present embodiment of the MDG uses a high availability IBM RS/6000 Model 920 (7015) Rack Mounted (SGR 2564 Processor/25 MHZ), with 16MB memory, Two SCSI Adapters, two IBM 9333 disk drives, a 2.3GB Internal 8mm Tape Drive, as well as network adapters, and an operations console. The platform used AIX V3.2 as its base operating system, with AIX Network Management, the AIX Windows Environment, and TCP/IP.

As shown in FIG. 1, the MDG is located at a Mobile Data Switching Center. It is connected to a cellular network by lines to a plurality of land-based transmitters, each having a controller. The MDG is also connected by trunk lines to various public and private networks as well as other cellular systems. This system, as well as the operation of the MDG within this system, is more fully described below.

RADIO RESOURCE MANAGEMENT

As part of its radio-resource or "Airlink" Management, the MDG actively participates in the selection of physical channels for transmission between the Mobile Data Base Station (MDBS) and the Subscriber Unit (SU) across the airlink and assists in determining when channel hopping must take place. The MDBS, which is comprised of the land-based transmitter and controller for a cell, transmits the forward channel which contains control information or data for the Subscriber Unit, and receives the reverse channel which contain subscriber responses.

The MDBS assigns logical channels to the physical channel pairs that are not currently being used for analog traffic. The MDBS transmits a continuous data stream on the forward channel. The Subscriber Units transmit on the reverse channel only during their assigned time slots. The MDG defines the duration of each Subscriber Unit's time slot. The MDG may alter the time slot allocation at any time including appropriating time slots to be used for emergency traffic.

The MDG may direct the MDBS to add or delete logical channels to prevent congestion of the airlink, inefficient usage of the scarce airlink resource, or to make additional channels available for analog traffic. The MDG makes the determination of the need to add or delete logical channels based on data and analog loading of the system. The MDG will ensure that a hysteresis effect is maintained to avoid unnecessary addition or deletion of logical channels.

If the MDG determines that congestion is occurring in the traffic and that adding additional logical channels would not adversely affect the analog traffic, the MDG will direct the MDBS to add one or more logical channels up the maximum limit of the MDBS's transmission capabilities. The MDG transmits an ADD LOGICAL CHANNEL packet to the MDBS to accomplish this function.

If the MDG determines that additional bandwidth is required for analog traffic or that the current data traffic and the usage trend for data traffic does not warrant as many channels as is currently allocated, the MDG will direct the MDBS to delete one or more logical changes by sending the MDBS a DELETE LOGICAL CHANNEL packet.

If the MDG directs the MDBS to delete a logical channel, the MDBS will instruct all Subscriber Units on that channel to change channels with a SWITCH CHANNEL packet before it deletes the channel. The MDBS will not acknowledge the MDG's DELETE LOGICAL CHANNEL packet until all Subscriber Units have acknowledged the SWITCH CHANNEL packet and ceased transmitting on the channel that is to be deleted.

Each subscriber unit communicates with the MDBS and the MDG across a virtual circuit. This virtual circuit can be regarded as the aggregate of all the active connections that the subscriber unit has established at any given time. Each Subscriber Unit's virtual circuit will be carried on the airlink on one logical channel at any point in time. The actual logical channel used may change either from a SWITCH CHANNEL packet or as it acquires a different logical channel as a result of channel hopping.

Each subscriber unit's virtual circuit is mapped onto a land line by the MDBS and transmitted to the MDG. Generally, a DS0 channel, that is a digital telephone circuit or time-multiplexed channel of 56 or 64 Kbs, is used to support the communications. More specifically, the MDG and the MDBS communicate across one or more 56 Kbps DS0 channels on one or more existing T1s from the cell site to the Mobile Switching Center where the MDG is located.

Each DS0 channel and each T1 will only carry the traffic of at most one MDBS and there will be one DS0 channel permanently dedicated to supporting cellular traffic between the MDG and the MDBS. It will be the responsibility of the Cellular Carrier to demultiplex the traffic destined for the MDG at the MSC T1 termination and deliver it to the MDG's cellular network interface.

The MDG will constantly monitor the data and analog traffic on the T1s. The MDG will maintain data traffic load measurements for each active MDBS. The analog traffic load data will be provided to the MDG by the Cellular Carrier. As data and analog T1 traffic requirements change, the MDG may activate or deactivate DS0 channels to each MDBS are required via the ADD DS0 CHANNEL and DELETE DS0 CHANNEL packets.

A given Subscriber Unit's virtual circuit (i.e., its forward and reverse traffic) will be carried on a single DS0 channel between the MDBS and the MDG. The MDBS assigns a specific DS0 to a Subscriber Unit at the time that the SU registers with the MDBS. The Subscriber Unit's virtual circuit traffic is carried on the same DS0 until the SU deregisters unless the MDBS is directed to change the its DS0 assignment by the MDG. The MDG may direct the MDBS to change the SU's DS0 assignment in order to correct congestion on the T1s or to consolidate cellular network traffic on to fewer DS0s using the CHANGE SUBSCRIBER CHANNEL packet.

The MDBS will forward reverse data packets from the Subscriber Units to the MDG. The MDG will route these reverse data packets to the correct NIM for the requested service for protocol conversion and correct addressing. Conversely, the MDG will route all forward data and broadcast packets received from a NIM originating at the Data Service Manger (DSM) or other applications to the MDBS to which the SU or member of a broadcast group is currently assigned using the virtual circuit and terminal address information in the packet. In addition, the MDG will initiate control packets sent to the MDBS or Subscriber Units attached to them. The MDG will be responsible for retransmission of unacknowledged forward packets destined for the MDBS. Likewise, the MDG will be responsible for retransmission of unacknowledged reverse packets destined for the NIM or other cellular network entities.

If additional DS0 channels cannot be added to clear congestion on the T1s between the MDBSs at the cell site and the MDG at the MSC, the MDG can cause one or all MDBSs to pause data transmission for flow control purposes by sending a MDBS DATA PAUSE packet. Upon receipt of this packet, the MDBSs will pause their Subscriber Units by sending them a REVERSE CHANNEL STATUS packet specifying that the Subscriber Unit is to pause data transmission although it may still send idle flags to the MDBS. The MDG will send a broadcast message to all MDBSs indicating which MDBSs have been paused. If a Subscriber Unit in an unaffected cell attempts a cell transfer into an affected cell, the MDBS will respond to the Subscriber Unit's SUBSCRIBER REGISTRATION/DEREGISTRATION packet by pausing the requesting Subscriber Unit until the congestion has cleared.

This MDBS DATA PAUSE packet will be retransmitted to all affected MDBSs at pre-specified intervals until the MDG detects that the congestion on the DS0 channels dedicated to the cellular network traffic has cleared or an additional DS0 channel can be added where necessary. At this time the MDG will send a MDBS DATA RESUME packet to affected MDBSs. The affected MDBSs will resume receiving from their Subscriber Units. Any Subscriber Units that are awaiting registration may being the registration process at this time.

The MDBS initiates channel hops to minimize collisions with analog traffic and to limit the duration of cellular traffic on a single physical channel, thus avoiding the likelihood of a collision with analog traffic. This function is accomplished by reassigning a logical channel to a different physical channel and by notifying the Subscriber Units to remap their logical channels to the same physical channel.

The MDBS notifies the MDG of planned channel hops. The MDG approves or vetoes channel selections to minimize co-channel interference based on its knowledge of analog and cellular traffic activity in nearby cells. The MDG monitors cellular traffic in the cells for which it is responsible by monitoring the MDBS's channel selection packets. The MDG gains its knowledge about the analog traffic in its cells by periodically obtaining the RF sniffing data from each MDBS via a REQUEST RF MONITORING DATA packet. The MDBS will respond to this request with a RF MONITORING DATA which indicates for each allocated channel if it is currently in use for analog traffic.

In addition, if the MDG has nothing to transmit to the MDBSs within a few seconds, it will send a REQUEST RF MONITORING DATA packet as a heartbeat packet. If the MDBS does not receive this packet within a pre-selected number of seconds, it will launch a CHANNEL SELECTION packet to the MDG containing the most recent channel selection data that it has even if this data has not changed since the last CHANNEL SELECTION was transmitted to the MDG. If the MDBS does not receive a CHANNEL SELECTION RESPONSE from the MDBS with the specified number of seconds, the MDBS will send an alert to its operations console and go into pause mode until communication with the MDG can be restored.

After the MDG has collected sufficient analog channel history, it will begin to predict future assignments in all cells which are assigned to it. The MDG will use the channel assignment predictions and the channel assignments of the adjacent cells of a MDBS which is requesting a channel hop to approve or veto the channel selection.

The MDG will send an ADJACENT MDBS CHANNEL UTILIZATION as part of the MDBS initialization process and as well as whenever any change occurs in channel utilization by adjacent MDBSs. This packet identifies one channel currently in use for cellular traffic in each cell adjacent to the MDBS receiving the packet. The MDG obtains this information from each MDBS through the use of a CHANNEL UTILIZATION packet. This packet is used to notify the MDG in real time of the physical channels in use for cellular traffic by each MDBS. The MDBS will send this packet to the MDG after initial channel setup and after every channel hop.

In addition, if the MDBS has not transmitted anything to the MDG within a specified number of seconds, it will send a CHANNEL UTILIZATION packet to the MDG as a heartbeat message even if there has been no change in the MDBS' channel utilization. If the MDG does not receive any packet from the MDBS within a specified number of seconds, it will launch a REQUEST RF MONITORING DATA to ensure that a CHANNEL UTILIZATION or other packet was not missed. If the MDG receives no reply from the MDBS within a specified number of seconds at will generate a critical alarm and send a message to the operator. In addition, any packets that the MDG receives for the failed MDBS will be rejected until which time that the MDBS re-establishes communications with the MDG. However, any packets which it has already acknowledged that are addressed to the failed MDBS will be queued for the MDBS until it is restored.

The MDBS will select candidate physical channels for cellular operation that are the least likely to be allocated soon to analog traffic. The MDBS will send its candidate physical channels in order of preference in a CHANNEL SELECTION where the most preferred channel being the channel least likely to be assigned analog traffic within the next specified number of seconds.

The MDG will approve or veto each of the channel selections by indication in a CHANNEL SELECTION RESPONSE packet. After receipt of this packet, the MDBS will assign its logical channels to physical channels in the order of preference indicated by the MDG. After the MDBS initiates transmission and reception over the approved channels, it sends a CHANNEL UTILIZATION packet to the MDG indicating its current channel utilizations.

In addition, the MDBS will periodically select channels that will be used for subsequent channel hops and send another CHANNEL SELECTION packet to the MDG for approval. The MDG will respond with a CHANNEL SELECTION RESPONSE packet as described above. The MDBS will then assign channels approved by the MDG for subsequent hops to the logical channels in rotating sequence beginning with the most preferred channel.

The MDBS will reassign a logical channel to a different MDG-approved physical channel upon any of the following events:

1. the MDBS predicts that analog activity will soon commence on the channel;
2. The maximum time for utilization of a channel has been reached; or
3. the RF sniffing equipment detects analog activity on the channel.

After every channel reassignment (or hop), the MDBS will send a SWITCH CHANNEL to its Subscriber Units and an updated CHANNEL UTILIZATION PACKET to the MDG to notify the MDG of the current physical channel on which it has mapped its logical channels.

The reverse channel is shared amongst Subscriber units either by contention or by reservation. The period of time when a Subscriber Unit is transmitting on the reverse channel is called a slot. The beginning of slots are signalled by the MDBS to the Subscriber Units either by the transmission of a REVERSE CHANNEL STATUS (RCS) packet specifying a free slot, or by the transmission of a RESERVE SLOT packet specifying that a slot is reserved for a particular until. The first physical frame of the slot is expected to start at the same time as the beginning of the next forward physical frame following the end of the either of the two slot indicator packets mentioned above. The slot will last for a period of time which is a multiple of the physical frame transmission time.

The MDBS will reserve a slot for a Subscriber Unit if an acknowledgement for a command or data packet is pending from the Subscriber Unit. In addition, the MDBS will reserve a slot for a SU if it is directed to do so by the MDG. The MDG will direct the MDBS to reserve a slot for a particular SU if the MDG has approved an Emergency level of service for the Subscriber Unit.

There are several conditions under which the MDBS may determine the normal or abnormal end of a slot. One of these conditions is expiration of the maximum slot size which is determined by the MDG. The maximum slot size may be different between consecutive slots.

MOBILITY MANAGEMENT

The cellular network must be able to transfer control of Subscriber Units between adjacent MDBSs, (i.e., cell transfer) and between different networks, (i.e., System Handoff) in response to movement of the Subscriber Unit without interruption of service.

The address of each Subscriber Unit authorized to access the cellular is held in the Data Home Location Register (DHLR) of the MDG. Each active Subscriber Unit will register with an MDG upon power up or cell transfer. The MDG will notify the DHLR of the Subscriber Unit's registration. Registration allows the DHLR to validate the subscriber unit's rights to access the Cell Plan II network. It also ensures that a subscriber's current location is known by the DHLR so that forward datagrams can be accurately routed and delivered or stored in the DSM if the Subscriber Unit is not currently active. Once the location of a Subscriber Unit is registered, subsequent forward datagrams can be correctly routed by the DSM to the appropriate MDG and MDBS.

Cell transfer may be initiated by either the MDBS or the Subscriber Unit.

Cell transfer will be attempted by the Subscriber Unit when it detects that it needs to change cells. In such event, the Subscriber Unit scans channels until it finds a channel for a new MDBS.

Cell transfer will be initiated by the MDBS's MDG determines that the subscriber unit would be better served by an adjacent MDBS. Each MDBS will be equipped with zero or more scanning receiver that may be used to support MDBS-initiated transfer. The scanning receivers at an MDBS will be tuned to channels in use for the cellular network at adjacent MDBSs, and used to measure the received signal strength indication (RSSI) of the Subscriber Units on those channels.

When an MDBS determines that one or more Subscriber Unit's received signal level at the MDBS is below an operator configurable threshold, and the Subscriber Unit is transmitting at maximum power, the MDBS will request the MDG to determine if the Subscriber Unit would be better served by an adjacent MDG. That is, this request will be initiated in order to determine if the Subscriber Unit should transfer.

The MDG will request RSSI data for the Subscriber Unit from the adjacent MDBSs equipped with scanning receivers.

The adjacent MDBSs will forward any existing valid RSSI data for the Subscriber Unit and every subsequent measurement until the MDG cancels the request.

The MDG will collect the RSSI data from the adjacent MDBSs and will determine if the RSSI for the candidate Subscriber Unit exceeds the threshold for transfer. If so, the MDG will command the MDBS to initiate a transfer to the MDBS that measured the strongest signal. The MDG will also notify the new MDBS of the Subscriber Unit's transfer.

If the number of scanning receivers at an MDBS is greater than or equal to the number of channels in use at the adjacent MDBSs, the MDBS shall dedicate a scanning receiver to each of the channels. If the number of scanning receivers is less than the number of channels in use at the adjacent MDBSs, the MDBS will use its scanning receiver(s) in the mode specified by the MDG in the SCANNING RECEIVER MODE packet.

The SCANNING RECEIVER MODE will direct the MDBS to use each of its scanning receivers in either a dedicated mode or a rotation mode. The scanning receiver mode is a parameter that will be configured by the operator. If an MDBS has multiple scanning receivers, each receiver can be independently commanded to either mode. However, the default mode is the rotation mode.

When directed to use dedicated mode, the MDBS will use the scanning receiver to monitor the specified MDBS/channel stream pair. The MDBS will map the MDBS/channel stream pair to a RF channel using the data in the ADJACENT MDBS CHANNEL UTILIZATION The MDG can use the dedicated mode to assign a scanning receiver to a channel at a time when a candidate subscriber is expected to transmit (e.g., a reserved slot).

When directed to use rotation mode, the MDBS uses the scanning receiver to sequence through all of the MDBS/channel stream pairs for which there is a current request for RSSI data, received via a REQUEST RSSI DATA packet, except those channels for which a scanning receiver has been dedicated. The receiver will dwell on the RF channel associated with each channel stream for a configurable amount of time before tuning to the next channel.

A channel hop may occur during the dwell time for a channel stream. In that case, the MDG will send an updated ADJACENT MDBS UTILIZATION packet, and the scanning receiver shall re-tune to the new RF channel. If multiple scanning receivers are in rotation mode, the MDBS swill stagger the rotation sequence, so that each receiver is listening to a different channel at a given point in time.

Each MDBS will maintain a list of its Subscriber Units for which the received signal strength is below a threshold. These subscriber units are candidates for cell transfer. The MDBS will send a REQUEST TRANSFER EVALUATION packet, which contains the list of transfer candidates on a channel stream to the MDG whenever the list changes.

If a Subscriber Unit changes its channel stream within the same MDBS, the MDBS will update the lists accordingly and send updated REQUEST TRANSFER EVALUATION packets to the MDG.

Upon receipt of a REQUEST TRANSFER EVALUATION packet, the MDG will send a REQUEST RSSI DATA packet to the adjacent MDBSs. The REQUEST RSSI DATA packet identifies the requesting MDBS, the channel stream number for the MDBS, and the list of candidate Subscriber Units. Each MDBS will maintain a list of requests for RSSI data. When a MDBS receives a REQUEST RSSI DATA packet for a specific MDBS/channel stream pair, the data will supersede the data in previous packets for the same MDBS/channel stream pair. Candidate subscriber units can be added or deleted with an updated packet.

The MDBS will retain RSSI data for all subscribers successfully received by a scanning receiver (i.e., the CRC is correct) whether or not the subscriber unit is on the candidate list. This ensures that the data is available if the subscriber unit subsequently becomes a candidate. The RSSI data will be considered valid for pre-specified period of time following the last measurement. After the time period has elapsed, the data will no longer be considered valid. Upon receipt of a REQUEST RSSI DATA packet, the MDBS will send all valid measurement data for the candidate subscriber units in a RSSI DATA packet, excluding data previously sent. If the RSSI data has expired and no new data is available to take its place, the MDBS will send the MDG a RSSI DATA packet containing all zeros in the RSSI data field.

The MDG will collect the RSSI data from the adjacent MDBSs and determine if one or more MDBSs has RSSI measurements that exceeds the threshold for transfer. If so, the MDG will select the MDBS that has the strongest RSSI measurement for transfer. The MDG will send a SWITCH CHANNELS packet to the requesting MDBS which in turn will be forwarded to the Subscriber Unit directing it to hand off.

If the MDG does not receive any RSSI data for a Subscriber Unit, or the measurements at the adjacent MDBSs do not exceed the transfer threshold, the current MDBS will continue to support the Subscriber Unit. The Subscriber Unit remains a candidate for transfer and the adjacent MDBSs swill send any subsequent RSSI measurements to the MDG. When the MDG receives the first RSSI DATA packet with a measurement that exceeds the transfer threshold, the MDG will wait a pre-selected number of seconds to collect RSSI DATA packets from other adjacent MDBSs. This wait period accounts for different delays between the MDG and other MDBSs that may have heard the same burst, and enables the MDG to select the best adjacent MDBS for transfer. The MDG will then command a transfer as described above.

Upon acquiring a channel for a new MDBS, the first packet that the Subscriber Unit transmits is a SUBSCRIBER REGISTRATION/DEREGISTRATION packet containing the su's Temporary Subscriber Identifier (TSI) which is assigned temporarily to a subscriber to protect the subscriber's identity. Upon receipt of this packet, the MDG determines if it has prior knowledge of the Subscriber Unit from another MDBS by examining the MDG field in the TSI. This field will contain the ID of the last MDG with which it was communicating prior to cell transfer.

If the MDG recognizes its own ID in the TSI, it will, after a pre-selected number of seconds send a TRANSFER NOTIFICATION packet to the previous MDBS which will immediately discontinue all activities related to the Subscriber Unit.

If the MDG recognizes an ID of another MDG in the same Cellular System, it will acquire any connection state information from the MDG previously supporting the subscriber unit by use of a GET CONNECTION DATA and will initiate support for the Subscriber Unit. If the cell transfer involves a transfer of active connections, the cell transfer is known as a cell handoff If the MDG does not recognize the MDG ID in the Subscriber Unit's TSI and cannot obtain information about its current activity from the MDG that issued the TSI, then the MDG will obtain the unit's IMSI using the INQUIRE IMSI packet. The Subscriber Unit will reply with the IMSI STATUS RESPONSE packet. The MDG will then query the DHLR to obtain registration and validation information about the Subscriber Unit.

If the MDG has changed, the new MDG will issue the Subscriber Unit a new TSI via the ASSIGN TSI packet. This packet will indicate whether the subscriber unit may resume any connections from the point at which it left off at the previous cell, or whether it is required to reset and reestablish all connections because the previous server MDG could not be located.

ADDRESSING AND IDENTIFICATION

Within the cellular network protocol, addresses and identifiers are required for Subscriber Units, application processes (including processors of broadcast messages), multicast groups, MDBS, and MDGs.

The Subscriber Unit may be identified in one of three ways.

1. Equipment Identifier (EI);
2. International Mobile Subscriber Identifier; or
3. Temporary Subscriber Identifier.

Subscriber Unit contains a permanent or removable Subscriber Identity Module (SIM) which contains the subscriber's International Mobile Subscriber Identifier and Temporary Subscriber ID. An example of a SIM is a Smart Card If the SIM is detachable, the EI will reside in a permanent module which interfaces to the SIM.

The Equipment Identifier is a 32 bit binary number that uniquely identifies a Subscriber Unit in any cellular system. The EI is created at manufacture time and will remain unaltered throughout the unit's lifetime. The EI is not used for addressing purposes within most cellular networks. It is used for identification, validation and authentication purposes.

The International Mobile Subscriber Identifier (IMSI) is a maximum of 15 digits encoded as a 60-bit binary number where each group of four consecutive bits is a BCD representation of the corresponding digit. It uses an international identification scheme described in CCITT E.212. It contains a three (3) digit mobile country code (e.g., Canada=302, US=310-316), a two (2) digit national network identifier, four (4) digits to localize the Metropolitan Statistical Area (MSA), a defined by the U.S. Department of Commerce Census Bureau and adopted by the U.S. Federal Communications Commission, or Rural Service Area (RSA), as defined by the U.S. Federal Communications Commission to define the areas outside of the MSAs, and six (6) digits to identify a specific subscriber with a MSA or RSA.

The IMSI is used to identify and address the Subscriber Unit on initial registration when it does not possess a Temporary Subscriber Identifier.

The Temporary Subscriber Identifier (TSI) is a 48-bit binary number which is assigned to a Subscriber Unit whenever it registers itself with a new MDG. It may be changed at other times by the MDG for security purposes. A TSI may be reassigned after a long period of time (i.e., a week or more). However, if the TSI is reassigned, authentication of the former SU assigned this number will fail and the IMSI will be required for authentication.

The TSI uses a private numbering plan within the internal data cellular system. The most significant 28-bits are used to identify the MDG assigning the TSI. These bits encode a 8 digit number formed by concatenating two 4 digit numbers: the first 4 digits identifying the network to which the MDG belong, and the second 4 digits identifying the MDG within that network. The least significant 20 bits identify the subscriber unit within the MDG.

The TSI is used to address messages to the Subscriber Unit across the airlink. For this purpose, only the least significant 20 bits are used except when responding to a SUBSCRIBER REGISTRATION/DEREGISTRATION packet. The TSI is also used to identify the Subscriber Unit when it is transmitting packets in a contention slot. For this purpose, only the least significant 20 bits are used unless the Subscriber Unit is transmitting a SUBSCRIBER REGISTRATION/DEREGISTRATION packet.

The full 48-bit TSI format is referred to as the long TSI. The least significant 20 bits is referred to as the short TSI.

Applications using the Subscriber Unit, or data services, may be identified in one of three different ways.

1. Network Service Access Point (NSAP)
2. Application Subaddressing; or
3. Connection Number.

A SU may have multiple network addresses assigned (e.g., personal, business, home alarm server, etc.). Each of these network address is called a Network Service Access Point (NSAP). The NSAP address identifies the mobile data subscriber or specific application of a subscriber. The NSAP is an OSI Layer 4 network address and is used like an application-to-application alias. A single address may have multiple concurrent instances. Furthermore, a subscriber unit may have more than one NSAP assigned to it up to a maximum of 16.

Examples of NSAP addresses are:

1. Mobile Subscribers (one or more per SU);
2. Fixed node addresses of network service;
3. Fixed data service (i.e., address of a particular service NSAP, e.g., Seattle Compuserve port);
4. Fixed broadcast cell;
5. Fixed broadcast zone;
6. Fixed multicast group
7. Logical data service address (i.e., address of any specific service NSAP, e.g., nearest Compuserve port)
8. Logical subscriber address (i.e., functional rather than specific, e.g., company vice president)
9. TSI to route packets to roaming subscribers.

An NSAP identifies an application process, either in a Subscriber Unit or at a data service. If the process identified by the NSAP acts as a front end for two or more other applications processes which are not identified by NSAP, then the calling party shall provide a subaddress to the application identified by the called NSAP, in order to access the desired application process. The size and formation of the subaddress is application specific.

If a calling party creates a connection to a called party, each side assigns a connection number to the connection at the time the connection is created, and transmits its number to the other. Therefore, each connection between two parties is uniquely identified by a pair of connection numbers shared between the two parities.

Once the connection has been set up each side uses its connection number to identify the connection until the connection is cleared by labelling transmitted packets with its connection number. The receiver of the packet identifies the connection to which it belongs by inspecting the connection number on the received packet.

The MDG uses the connection number to determine the onward routing of a data packet received on the reverse channel. The Subscriber Unit uses the connection number to identify the application process which is to receive a packet received on the forward channel.

A connection number is a four bit identifier taking a value between 0 and 15. Thus, a Subscriber Unit may have up to 16 connections simultaneously active. The connection number identifies data related to the connection when that data is transferred between the Subscriber Unit and the MDG.

Relative to Group Addressing, an NSAP may be used to address a specific set of subscribers. This set may be defined by location or membership in a group. Broadcast groups are defined by location and can include all members of one or more cells. Multicast groups, on the other hand, are defined by subscriber registration as a member of one or more multicast groups.

There are two types of Broadcast Services:

1. Cell Broadcast Service; and
2. Zone Broadcast Service

Cell Broadcast Service allows a message to be broadcast to all of the Subscriber Units present within a cell. These messages are intended to be of interest to many or all of the Subscriber Units present in the serving territory of a cell. Cell broadcast messages are sent from the cell site toward the subscriber units and the messages are not acknowledged.

Zone Broadcast Service divides cells in a fixed group of one or more cells. Zones are used to facilitate the specification for the distribution of a broadcast message. These zones applicable for a message may be specified on a subscription basis per message type or on demand for each message. A broadcast zone defines a territory in terms of group of cells and their serving MDG. Each broadcast zone list has a name to identify it. A broadcast message may specify its distribution as a number of cells and/or broadcast zones. Broadcast zones should be predefined by the network operator.

Datagrams which are broadcast to either a cell or a zone contain a Broadcast Application Identifier (BAI). The BAI is a 32 bid identifier which identifies the application capable of processing the datagram.

The original of the datagram addresses the datagram by NSAP. The NSAP will identify the channel, cell or group of cells destined to receive the datagram as well as the application process which will process it. The MDG translates the NSAP address into a BAI address before transmitting the datagram.

The Group Multicast Service allows sending of a message to a group of cells, as in cell broadcasting. However, multicasting is a dynamic list of cells which is dependent upon the presence of one or more registered subscriber units which are members of the multicasting service. The member subscriber may log in to the multicast service automatically as they register as part of their subscription options or the subscribers may log in on demand. Data encryption is required for multicast services because all multicast messages must be received by the subscriber units to determine if the particular message is intended for the subscriber unit.

A Multicast Group Number (MGN) is a 32 bit identifier that is unique system wide. Multicast group numbers are assigned by the system operator at the request of service operators who require them. The multicast group number is used to address multicast datagrams.

The originator of the datagram shall address the multicast group by NSAP. The MDG translates the NSAP address into a MGN before transmitting the datagram.

When the MDG receives a forward datagram addressed to a given broadcast or multicast group, it will determine the locations of all subscribers that are active members of the group, and send the datagram to the corresponding MDBSs for transmission.

To address the Mobile Data Base Stations, each MDBS will be assigned a unique 36-bit identifier called an MDBS ID The most significant 28 bits of the MDBS ID will be the ID of its MDG. The least significant 8 bits of the MDBS ID will be different for each MDBS connected to a given MDG.

The least significant 8 bits of the MDBS ID will be included in all control packets exchanged between the MDG and its MDBSs.

To address the MDGs, Each MDG in a given Cellular System is assigned a unique 28-bit identifier called a MDG ID. The MDG ID is identical to the most significant 28 bits of a long TSI. An MDG may be known by different MDG IDs to different MDBSs. However, for a given MDBS only one MDG ID is knows for the MDG to which it is connected.

Control of the Subscribers is achieved through registration and identification.

Registration allows the MDG to validate the Subscriber Unit's access rights to the cellular network, the multicast groups to which it belongs, and the value added networks and services on those network to which it has access. The MDG accomplishes these functions through data it maintains on its local Subscriber Units in the Data Home Location Register (DHLR). The registration process also ensures that Subscriber Unit's current location is always known to the MDG and to the DHLR through control packets sent to it from the MDG. The Subscriber Unit's current location is required so that forward datagrams can be accurately routed from the Data Services Manager (DSM) and delivered by the MDG through the correct MDBS.

The Subscriber Unit issues a SUBSCRIBER REGISTRATION/DEREGISTRATION packet at power up, power down, and immediately after a cell transfer where the first packet transmitted in the new cell will be a SUBSCRIBER REGISTRATION/DEREGISTRATION packet. This packet will contain the Temporary Subscriber ID (TSI) if the SU is changing cells, MDGs or cellular systems.

If the TSI field is all zeros the MDG will understand that the Subscriber Unit is a user not previously identified since the unit's last power down rather than a handoff subscriber from another cell, MDG, or system. Channel hopping within the same cell, however, will not necessitate a new SUBSCRIBER REGISTRATION/DEREGISTRATION to be sent by the Subscriber Unit to the MDG.

A subscriber is identified as follows. After receipt of a SUBSCRIBER REGISTRATION/DEREGISTRATION containing a TSI, the MDG will determine if the TSI is an id that it issued or it will recognize within the TSI the ID of a peer MDG within its same cellular system. If a peer MDG as the issued the TSI, the MDG will query this peer MDG and request the International Mobile Subscriber Identifier (IMSI).

If the MDG does not recognize a peer MDG id imbedded in the TSI, it must query the Subscriber Unit for its IMSI. The MDG will use the IMSI to identify the DHLR to which the Subscriber Unit belongs.

When the MDG receives a SUBSCRIBER REGISTRATION/DEREGISTRATION packet, containing a Temporary Subscriber Identifier that it recognizes as one it previously issued, it will search its Active Subscriber Unit database to obtain the registration data for the requesting Subscriber Unit. Upon locating the Subscriber Unit in its Active Subscriber Unit database, the MDG will approve registration and launch a DHLR SUBSCRIBER LOCATION UPDATE message in order to register the subscriber unit's current serving MDG.

If the MDG fails to locate the requesting Subscriber Unit in its Active Subscriber Unit database or does not recognize the TSI as originating in the same system, the MDG requests the IMSI from the Subscriber Unit and then launches a query to the DHLR that was identified in the IMSI requesting the SU's registration data. If the DHLR cannot locate the requesting Subscriber Unit's registration information in its database, it will reject the Subscriber Unit's registration request.

In order to "deregister," the Subscriber Unit sends a SUBSCRIBER REGISTRATION/DEREGISTRATION prior to powering off the unit. This notifies the MDG that the Subscriber Unit is going to be inactive. The MDG then:

1. incorporates this information into its forward channel traffic load computations,
2. notifies the DHLR that the SU will not be available to receive forward messages,
3. notifies the Data Service Mangers (DSMs) that the SU will not be available to receive forward datagrams, and
4. removes the Subscriber Unit from all multicast groups broadcast list on which the MDG had the SU as an active member.

If the Subscriber Unit that is powering down was the only SU belonging to a particularly multicast group in a given cell, the MDG will discontinue broadcasting to that cell packets addressed to the multicast group. If the powering down SU was the only unit belonging to a particular multicast group in the MDG's sphere of control, the MDG will notify the Data Service Manager (DSM) with a MULTICAST GROUP LOGOUT message to discontinue forwarding multicast messages for that particular group to that MDG. Other MDG's in the Cell Plan II network will not be affected by this action.

The SUBSCRIBER REGISTRATION/DEREGISTRATION is also used by a Subscriber Unit as a heartbeat message to the MDBS. That is, If the MDBS does not receive this packet within a prescribed time, it will confirm that the Subscriber Unit has failed and then notify the MDG. The MDG will wait a pre-selected number of seconds for a valid SUBSCRIBER REGISTRATION/DEREGISTRATION for that SU and then update the DHLR and reject any packets it receives for that Temporary Subscriber ID (TSI).

If there are packets addressed to the failed Subscriber Unit that the MDG has already acknowledged, it will discard those packets. In addition, if the failed subscriber Unit is the only member of a multicast group that was active in a cell, the MDG will cease forwarding datagrams addressed to that multicast group to the failed SU's MDBS.

Broadcast and multicast group NSAPs are assigned by the system operator at the request of service operators who require them. The one exception is that Broadcast Group O which is reserved to mean "all subscriber units". In order to be an active member of the group the subscriber unit must successfully complete a registration process. All Subscriber Units are permanently active in Group O. A Subscriber Unit may be a member of 16 broadcast or multicast groups in addition to Group O.

The DHLR sends a Subscriber Unit's group memberships to the MDG during the validation process. The MDG launches a MULTICAST GROUP LOGIN message to inform a multicast group Data Service Manager (DSM) that a MDG has one or more SUs available for multicast data service. This message is only sent for the first subscriber registering to a the multicast group(s) supported by the DSM.

The MDG must authenticate each Subscriber Unit when it registers with the MDG. The MDG may also request authentication from a Subscriber Unit at any time.

The authentication procedure is based on an encryption algorithm a key, a sequence number and the terminal address of the subscriber unit. The key, the terminal address and the sequence number are combined, via an encryption algorithm, to generate an authenticator. The encryption algorithm is embodied in the Subscriber Units. Each Subscriber Unit maintains two keys for the algorithm, referred to as an even key, and an odd key. References to the parity of a key are used to designate the even or odd key, and does not relate to the parity of any specific key value. At manufacture time, the odd key will be set equal to the initial key. The MDG, through the MDBS will be able to load new keys into the subscriber unit via the AUTHENTICATION packet. The MDG obtains the initial key and the authentication algorithm for the DHLR during the validation process at registration.

Each AUTHENTICATION packet loading a new key will identify whether the key being loaded is the even key or the odd key. Once the MDG has instructed the MDBS to load a key of a given parity, the MDG will not attempt to load a key of the other parity until the MDG has received an acknowledgement from the MDBS that the key load was successful. The next key load following a successful key load will load a key of the opposite parity. The first key loaded by the MDG into a Subscriber Unit after manufacture will be an even key.

After three (3) attempts, if the MDBS cannot successfully load the new key, it will notify the MDG of the failure of the key load. The MDG will then attempt to reload the same key. If this key load attempt is unsuccessful, the MDG will then attempt to load a different key identified by the same parity.

The sequence number is maintained by both the MDG and the Subscriber Unit. The sequence number is set to zero at the time that the Subscriber Unit is manufactured. The sequence number is incremented by the Subscriber Unit upon receipt of an AUTHENTICATION packet loading a new key associated with the parity of the current value of the sequence number. For example, the initial Sequence Number is 0 which is considered to have a parity of even. The first key that the MDG loads into the Subscriber Unit after manufacturer is always even (the odd parity is loaded during the manufacturing process). Therefore, the Sequence Number and the key have the same parity and the Sequence Number is incremented to 1 making the sequence number parity now odd. Thus, after the successful completion of a key load, the Sequence Number will have the opposite parity to the index of the key which was last loaded. The MDG increments the corresponding sequence number that it maintains after receiving acknowledgement for a successful key load from the MDBS currently supporting the Subscriber Unit in question.

If the MDG attempts to load a new key to a Subscriber Unit with an associated parity which is opposite to that of the current value of the sequence number, the Subscriber Unit shall store the new key, associating it with the requested parity, and will acknowledge the key load, but it WILL NOT increment the sequence number and neither does the MDG.

The MDG can request to the Subscriber Unit to provide an authenticator at any time by sending an AUTHENTICATION packet. The subscriber unit will use the sequence number to determine which key to use, i.e., the key selected is the one whose index is of opposite parity to the parity of the current value of the sequence number. The Subscriber Unit will generate the authenticator and will reply to the AUTHENTICATION packet with the authenticator indicating the parity of the key selected in the response. If the authenticator was requested while the MDG is waiting for the acknowledgement of a new key load, it can use this information to determine whether the key load was successful.

If the MDBS has not received an acknowledgement for an authentication request within a pre-selection period of time (generally a few milliseconds), the MDBS will retransmit the authentication packet. After three (3) transmission attempts, the MDBS will inform the MDG. The MDG will wait a pre-specified number of seconds and then repeat the request.

To protect against the possibility that the sequence number held by the MDG and that held by the Subscriber Unit get out of sync by more than the transitional case of a MDG awaiting an acknowledgement for a key load, it is possible to cause the Subscriber Unit to reset its sequence number to zero through an AUTHENTICATION packet initiated by the MDG. If this option is requested by the MDG, the Subscriber Unit will reset its sequence number to zero, reload the initial key into the odd key, and generate an authenticator based on the initial key. This authenticator will be returned to the MDG by a conventional response to an authentication request.

If the Subscriber Unit fails to generate the correct authenticator to an authentication request, or if there are other reasons to believe the unit is not a legitimate user of the system, the system operator may ZAP the unit. If this option is selected, the MDG will notify the DHLR, MDG and the MDBS will discard all input from or to the unit, and a zap packet will be sent to the subscriber unit. The zap packet will be acknowledged by the Subscriber unit. If an acknowledgement is not received with a pre-specified number of seconds, the packet will be retransmitted. Up to three (3) attempts will be made to deliver the ZAP packet.

If the MDBS or MDG receives input at a later time from a ZAPPED unit, except when restoring the unit to the system as described below, it shall respond with another ZAP packet. However, ZAP packets sent after the initial ZAP will not be sent more often than once per specified number of minutes per unit. Input received between ZAP packet transmissions will be discarded without reply. Furthermore, any packets received by the MDG for that subscriber unit in the forward direction will be discarded. Only the ZAP packet or a AUTHENTICATION packet which resets the sequence number will be delivered to the Subscriber Unit. The MDBS and the MDG will accept Subscriber Units' registration packets from a zapped unit for the purpose of detecting its presence for this authentication request.

Various tables will be maintained in the MDG to support its functions. Among these tables are the DHLR, the Adjacent Cell Map and a Frequency Allocation Table.

The Data Home Location Register (DHLR) contains information about subscribers and subscriber units as well as features and functions and network services that each customer is permitted access to. There will be one record or table entry for each subscriber and that record will contain the subscriber information (for example: Phone Number (Key field), Address of home MDG, Last assigned TSI, Current cell assignment, and IMSI) and connection information (for example: near end virtual circuit identifier, Far end virtual circuit identifier, and Interface virtual circuit identifier).

The Adjacent Cell Map containing an entry for each cell connected to a given MDG. Within each record there will be 6 entries containing the address of the cells directly adjacent to the cell for which the record is defined, and a pointer to a frequency allocation table for this cell.

The Frequency Allocation Table identifies the channels or frequencies utilized by each cell in a region.

Another function performed by the MDG is the collection of Network Routing Data, including origin and destination, on each incoming and outgoing message. The information retained for each message includes the origin and destination and the MDG application with which the message is associated. The MDG should have a list of all terminal addresses that can be associated with an incoming or outgoing message. For each terminal, the MDG should maintain a count of incoming messages from that terminal to each MDG application. A separate set of counts should be kept for each incoming and outgoing messages.

Although a specific embodiment of the invention has been disclosed, it will be understood by those having skill in the art, that changes can be made to the specific embodiment without departing from the spirit and the scope of the invention Accordingly, what is claimed is:

1. A method for managing the communication of data packets between a mobile data radio terminal and a plurality of fixed base stations in a data communications network, in which each base station includes a set of cellular telephone voice transceivers, each tuned to one of a preselected set of communication channels, and means for coupling each transceiver in said set of transceivers to an antenna to facilitate the performance of duplex radio communications over said set of channels with said mobile data radio terminal within range of at least one of said fixed base stations, including a first and second base stations coupled through a first mobile data gateway to said data communications network and a third base station coupled through a second mobile data gateway to said data communications network, the method for managing comprising steps of:

allocating with said first mobile data gateway, a first channel at said first base station, for the mobile data radio terminal;

receiving a data packet from said mobile data radio terminal, including first signal strength measurement data for said first base station, second signal strength measurement data for said second base station and third signal strength measurement data for said third base station;

determining if said third signal strength measurement data is better than said first signal strength measurement data and said second signal strength measurement data and if so, establishing in said first mobile data gateway, a forwarding address to said second mobile data gateway, sending forwarding information from said first mobile data gateway to said second mobile data gateway, and allocating with said second mobile data gateway, a new channel at said third base station, for said mobile data radio terminal; and if said third signal strength measurement data is not better than said second signal strength measurement data, then determining if said second signal strength measurement data is better than said first signal strength measurement data and if so, allocating with said first mobile data gateway, a new channel at said second base station, for said mobile data radio terminal, the mobile data gateway coupled to the base station receiving the strongest signal strength being defined as the serving mobile data gateway.

2. The method of claim 1, which further comprises:

monitoring the size of forward data packets received at said serving mobile data gateway from said data communications network to be sent to said mobile data radio terminal;

allocating an additional channel to said mobile data radio terminal when said forward data packet size is greater than a threshold value.

3. The method of claim 1, which further comprises:

monitoring the size of forward data packets received at said serving mobile data gateway from said data communications network to be sent to said mobile data radio terminal;

allocating an additional time slot in a channel already allocated to said mobile data radio terminal when said forward data packet size is greater than a threshold value.

4. The method of claim 1, which further comprises:

receiving a forward data packet at said first mobile data gateway from said data communications network, directed to said mobile data radio terminal;

determining if said forwarding address exists in said first mobile data gateway, to said second mobile data gateway and if so, sending said forward data packet to said second mobile data gateway;

if said forwarding address does not exist, then determining whether said mobile data radio terminal has a channel allocated from either said first base station or said second base station and if so, sending said forward data packet to either said first or second base station determined to have a channel so allocated.

5. A system for managing the communication of data packets between a mobile data radio terminal and a plurality of fixed base stations in a data communications network, in which each base station includes a set of cellular telephone voice transceivers, each tuned to one of a preselected set of communication channels, and means for coupling each transceiver in said set of transceivers to an antenna to facilitate the performance of duplex radio terminal communications over said set of channels with said mobile data radio terminal within range of at least one of said fixed base stations, comprising:

first and second base stations coupled through a first data gateway to said data communications network;

a third base station coupled through a second data gateway to said data communications network;

allocating means in said first data gateway, for allocating a first channel at said first base station, for the mobile data radio terminal;

storage means in said first data gateway, receiving a data packet from said mobile data radio terminal, including first signal strength measurement data for said first base station, second signal strength measurement data for said second base station and third signal strength measurement data for said third base station;

first determining means in said first data gateway, coupled to said storage means, for determining if said third signal strength measurement data is better than said first signal strength measurement data and said second signal strength measurement data and if so, establishing in said first data gateway, a forwarding address to said second data gateway, sending forwarding information from said first data gateway to said second data gateway, and allocating with said second data gateway, a new channel at said third base station, for said mobile data radio terminal; and said first determining means determining if said third signal strength measurement data is not better than said second signal strength measurement data, then determining if said second signal strength measurement data is better than said first signal strength measurement data and if so, allocating with said first data gateway, a new channel at said second base station, for said mobile data radio terminal, the mobile data gateway coupled to the base station receiving the strongest signal strength being defined as the serving mobile data gateway.

6. The system of claim 5, which further comprises:

monitoring means, for monitoring the size of forward data packets received at said serving mobile data gateway from said data communications network to be sent to said mobile data radio terminal;

said allocating means, allocating an additional channel to said mobile data radio terminal when said forward data packet size is greater than a threshold value.

7. The system of claim 5, which further comprises:

monitoring means, for monitoring the size of forward data packets received at said serving mobile data gateway from said data communications network to be sent to said mobile data radio terminal;

said allocating means, allocating an additional time slot in a channel already allocated to said mobile data radio terminal when said forward data packet size is greater than a threshold value.

8. The system of claim 5, which further comprises:

receiving means, for receiving a forward data packet at said first data gateway from said data communications network, directed to said mobile data radio terminal;

second determining means for determining if said forwarding address exists in said first data gateway, to said second data gateway and if so, sending said forward data packet to said second data gateway; and said second determining means determining if said forwarding address does not exist, then determining whether said mobile data radio terminal has a channel allocated from either said first base station or said second base station and if so, sending said forward data packet to either said first or second base station determined to have a channel so allocated.

9. A method for managing the communication of data packets between a mobile data radio terminal and a plurality of fixed base stations in a data communications network, in which each base station includes a set of transceivers, each tuned to one of a preselected set of communication channels, and means for coupling each transceiver in said set of transceivers to an antenna to facilitate the performance of duplex radio terminal communications over said set of channels with said mobile data radio terminal within range of at least one of said fixed base stations, including a first and second base stations coupled through a first mobile data gateway to said data communications network and a third base station coupled through a second mobile data gateway to said data communications network, the method for managing comprising steps of:

allocating with said first mobile data gateway, a first channel at said first base station, for the mobile data radio terminal;

receiving a data packet from said mobile data radio terminal, including first signal strength measurement data for said first base station, second signal strength measurement data for said second base station and third signal strength measurement data for said third base station;

determining if said third signal strength measurement data is better than said first signal strength measurement data and said second signal strength measurement data and if so, establishing in said first mobile data gateway, a forwarding address to said second mobile data gateway, sending forwarding information from said first mobile data gateway to said second mobile data gateway, and allocating with said second mobile data gateway, a new channel at said third base station, for said mobile data radio terminal; and if said third signal strength measurement data is not better than said second signal strength measurement data, then determining if said second signal strength measurement data is better than said first signal strength measurement data and if so, allocating with said first mobile data gateway, a new channel at said second base station, for said mobile data radio terminal.

10. A system for managing the communication of data packets between a mobile data radio terminal and a plurality of fixed base stations in a data communications network, in which each base station includes a set of transceivers, each tuned to one of a preselected set of communication channels, and means for coupling each transceiver in said set of transceivers to an antenna to facilitate the performance of duplex radio terminal communications over said set of channels with said mobile data radio terminal within range of at least one of said fixed base stations, comprising:

first and second base stations coupled through a home data gateway to said data communications network;

a third base station coupled through a server data gateway to said data communications network;

allocating means in said home data gateway, for allocating a first channel at said first base station, for the mobile data radio terminal;

storage means in said home data gateway, receiving a data packet from said mobile data radio terminal, including first signal strength measurement data for said first base station, second signal strength measurement data for said second base station and third signal strength measurement data for said third base station;

determining means in said home data gateway, coupled to said storage means, for determining if said third signal strength measurement data is better than said first signal strength measurement data and said second signal strength measurement data and if so, establishing in said home data gateway, a forwarding address to said server data gateway, sending forwarding information from said home data gateway to said server data gateway, and allocating with said server data gateway, a new channel at said third base station, for said mobile data radio terminal; and said determining means determining if said third signal strength measurement data is not better than said second signal strength measurement data, then determining if said second signal strength measurement data is better than said first signal strength measurement data and if so, allocating with said home data gateway, a new channel at said second base station, for said mobile data radio terminal.

11. A method for managing the communication of data packets between a mobile data radio terminal and a plurality of fixed base stations in a data communications network, in which each base station includes a set of cellular telephone voice transceivers, each tuned to one of a preselected set of communication channels, and means for coupling each transceiver in said set of transceivers to an antenna to facilitate the performance of duplex radio terminal communications over said set of channels with said mobile data radio terminal within range of at least one of said fixed base stations, including a first and second base stations coupled through a home mobile data gateway to said data communications network and a third base station coupled through a server mobile data gateway to said data communications network, each base station further including at least one data transceiver, and a set of sensors coupled to each voice transceiver in said set of voice transceivers, the method for managing comprising steps of:

determining in said first base station, when it is safe to switch said data transceiver onto a first channel to which a particular one of the voice transceivers in said set of voice transceivers is tuned;

allocating with said home mobile data gateway, said first channel at said first base station, for the mobile data radio terminal;

receiving a data packet from said mobile data radio terminal, including first signal strength measurement data for said first base station, second signal strength measurement data for said second base station and third signal strength measurement data for said third base station;

determining if said third signal strength measurement data is better than said first signal strength measurement data and said second signal strength measurement data and if so, establishing in said home mobile data gateway, a forwarding address to said server mobile data gateway, sending forwarding information from said home mobile data gateway to said server mobile data gateway, and allocating with said server mobile data gateway, a new channel at said third base station, for said mobile data radio terminal;

if said third signal strength measurement data is not better than said second signal strength measurement data, then determining if said second signal strength measurement data is better than said first signal strength measurement data and if so, allocating with said home mobile data gateway, a new channel at said second base station, for said mobile data radio terminal, the mobile data gateway coupled to the base station receiving the strongest signal strength being defined as the serving mobile data gateway; and determining in said first base station, when to turn off said data transceiver based on sensing a demand for said first channel by said particular one of the voice transceivers.

12. The method of claim 11, which further comprises:

monitoring the size of forward data packets received at said serving mobile data gateway from said data communications network to be sent to said mobile data radio terminal;

allocating an additional channel to said mobile data radio terminal when said forward data packet size is greater than a threshold value.

13. The method of claim 11, which further comprises:

monitoring the size of forward data packets received at said serving mobile data gateway from said data communications network to be sent to said mobile data radio terminal;

allocating an additional time slot in a channel already allocated to said mobile data radio terminal when said forward data packet size is greater than a threshold value.

14. The method of claim 11, which further comprises:

receiving a forward data packet at said home mobile data gateway from said data communications network, directed to said mobile data radio terminal;

determining if said forwarding address exists in said home mobile data gateway, to said server mobile data gateway and if so, sending said forward data packet to said server mobile data gateway;

if said forwarding address does not exist, then determining whether said mobile data radio terminal has a channel allocated from either said first base station or said second base station and if so, sending said forward data packet to either said first or second base station determined to have a channel so allocated.

15. The method of claim 14 which further comprises:

receiving in said home mobile data gateway a demand to conduct a ZAP operation or discard all input from or to said mobile radio terminal on said first channel;

performing the ZAP operation in said home mobile data gateway on said first channel.

16. The method of claim 14 which further comprises:

periodically requesting by said home mobile data gateway RF sniffing data OR ANALOG SIGNAL ACTIVITY from said first base station by transmitting a REQUEST RF MONITORING DATA PACKET to said first base station.

17. The method of claim 16 which further comprises:

said home mobile data gateway sending to said first base station said REQUEST RF MONITORING DATA PACKET as a heartbeat signal.

18. The method of claim 14 which further comprises:

said home mobile data gateway sending to said first base station a REQUEST RF MONITORING DATA PACKET as a heartbeat signal.

19. The method of claim 14 which further comprises:

said home mobile data gateway sending to staid first base station an ADD LOGICAL CHANNEL packet to add a logical channel.

20. The method of claim 14 which further comprises:

said home mobile data gateway sending to said first base station a DELETE LOGICAL CHANNEL packet to delete a logical channel.

21. The method of claim 14 which further comprises:

said home mobile data gateway sending to said first base station an MOBILE DATA BASE STATION (MDBS) DATA PAUSE PACKET to cause said first base station to pause data transmission.

22. The method of claim 14 which further comprises:

said home mobile data gateway sending to said first base station an MDBS DATA RESUME PACKET to cause said first base station to resume data transmission.

23. The method of claim 14 which further comprises:

said home mobile data gateway sending to said first base station an ADJACENT MDBS CHANNEL UTILIZATION packet to obtain information from said first base station.

24. The method of claim 14 which further comprises:

said home mobile data gateway sending to said first base station an CHANNEL SELECTION RESPONSE packet to response to a channel selection by said first base station.

25. The method of claim 14 which further comprises:

said home mobile data gateway receiving from said first base station a REVERSE CHANNEL STATUS packet specifying a free slot.

26. A system for managing data packets between a mobile radio terminal and a plurality of base stations in a communications network comprising:

a first mobile data gateway coupling a first and second base station to the network;

a second mobile data gateway coupling a third base station to the network;

means for sending a forwarding address from the first mobile data gateway to the second mobile data gateway for allocating with the second mobile data gateway a new channel at the third base station for the mobile data radio terminal; and means for further allocating the new channel among the base stations according to a comparison of a signal strength measurement for each base station included in the data packet, the mobile data gateway coupled to the base station receiving the strongest signal strength being defined as the serving mobile data gateway.

27. The system of claim 26 further including means for tracking the amount of packet data which has been sent to and received from the network by the mobile radio data terminal.

28. The system of claim 26 further including means for monitoring the size of data packets received at the serving mobile data gateway for the mobile data radio terminal and allocating an additional channel when the data packet size is greater than a threshold value.

29. The system of claim 26 further including means for determining if the data packet from the network has a forwarding address in the first mobile data gateway for the second mobile data gateway, and (i) if so, sends the data packet to the second mobile data gateway, and (ii) if not, sends the data packet to the serving mobile data gateway.

30. The system of claim 26 further including means for accurately billing a user of a mobile data radio terminal based upon use of the network.

31. The system of claim 26 further including means for ensuring that only the packet data received from and transmitted to the mobile data radio terminal for a subscriber is properly routed to and received from the subscriber.

* * * * *